United States Patent [19]

Miyao et al.

[11] Patent Number: 4,739,203
[45] Date of Patent: Apr. 19, 1988

[54] SINGLE-PHASE BRUSHLESS MOTOR WITH COGGING FEATURES

[75] Inventors: Osami Miyao, Sagamihara; Manabu Shiraki, Yamato, both of Japan

[73] Assignee: Shicoh Engineering Co. Ltd., Kanagawa, Japan

[21] Appl. No.: 923,088

[22] Filed: Oct. 24, 1986

[51] Int. Cl.$^4$ .................. H02K 37/00; H02K 29/08
[52] U.S. Cl. .................. 310/67 R; 310/156; 318/254
[58] Field of Search .......... 310/67 R, 68 R, 68 B, 310/152, 156, 162; 318/138, 254

[56] References Cited

U.S. PATENT DOCUMENTS

| | | | |
|---|---|---|---|
| 4,217,508 | 8/1980 | Uzuka | 310/46 |
| 4,499,420 | 2/1985 | Shiraki et al. | 310/156 |

FOREIGN PATENT DOCUMENTS

| | | | |
|---|---|---|---|
| 1563266 | 4/1970 | Fed. Rep. of Germany | 310/67 R |
| 3128417 | 5/1982 | Fed. Rep. of Germany | |
| 3526007 | 1/1986 | Fed. Rep. of Germany | |
| 59-77277 | 11/1985 | Japan | 310/156 |

Primary Examiner—Patrick R. Salce
Assistant Examiner—D. L. Rebsch
Attorney, Agent, or Firm—Wegner & Bretschneider

[57] ABSTRACT

A single-phase brushless motor which can rotate smoothly by a uniform torque over an entire range of rotation with reduced torque ripples, without generating a high cogging torque for allowing self-starting of the motor. The motor comprises a field magnet as a rotor having 2P north and south magnetic poles, either the north or the south poles having a width equal to an electrical angle of about 120 degrees while the other poles have a width equal to an electrical of about 240 degrees. The field magnet is mounted for rotation in an opposing relationship to a stator armature core which has a plurality of radially extending stator poles formed in a circumferentially equidistantly spaced relationship thereon. A plurality of stator coils for two phases are wound selectively on the stator poles. An electric circuit detects the position of the field magnet to energize the armature coils for the two phases alternately for an electric angle of about 180 degrees.

17 Claims, 20 Drawing Sheets

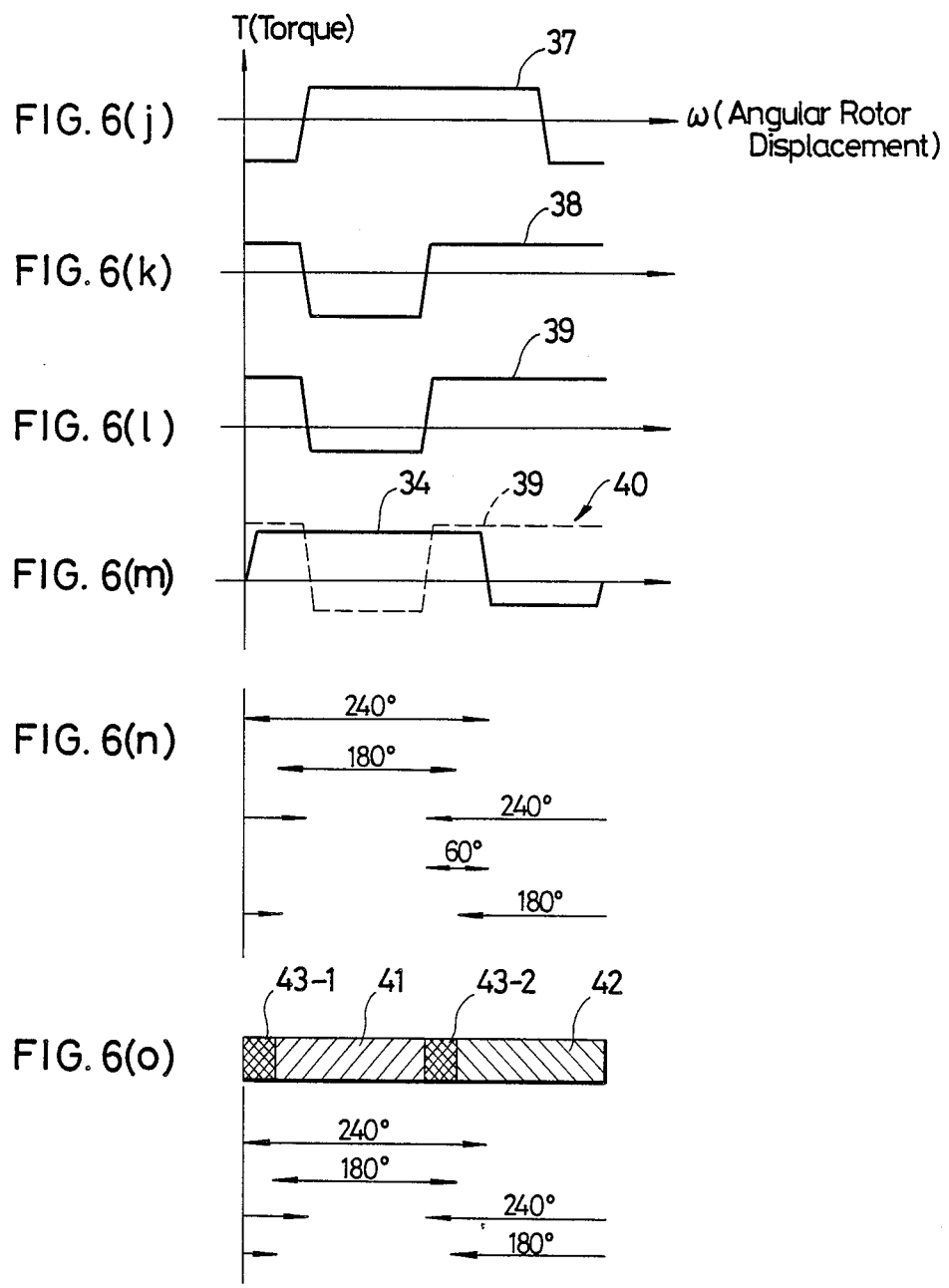

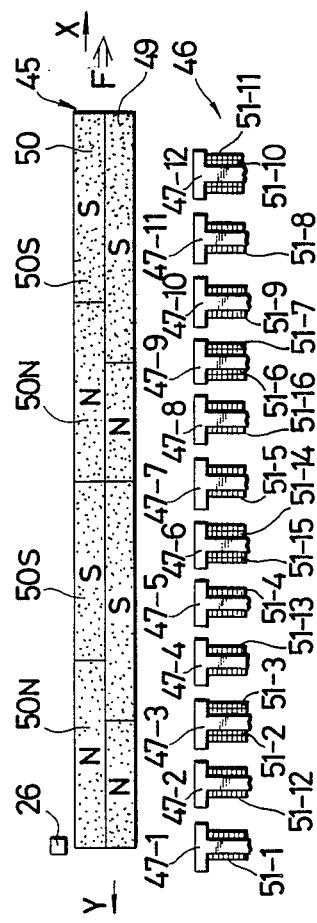
FIG. 10(a)
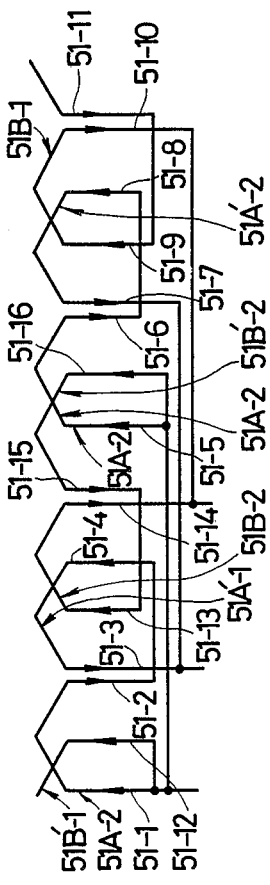
FIG. 10(b)
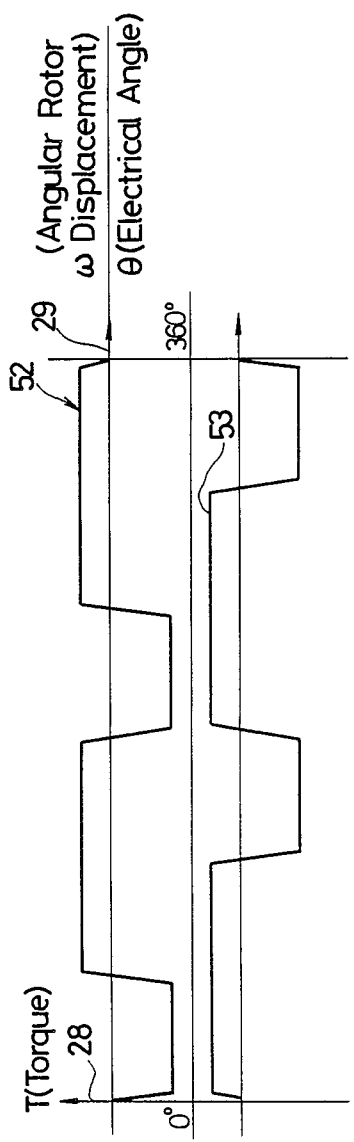
FIG. 10(c)
FIG. 10(d)

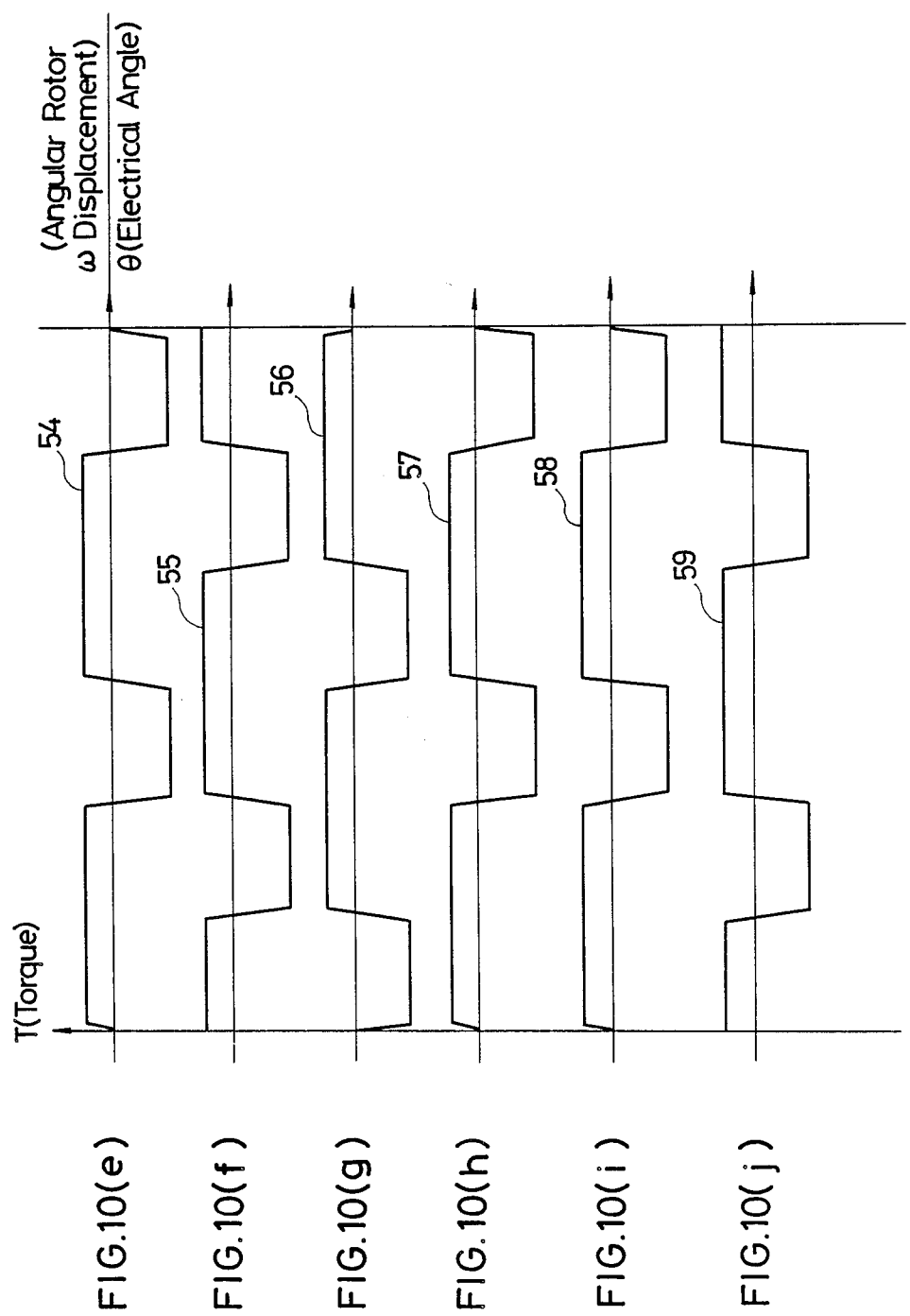

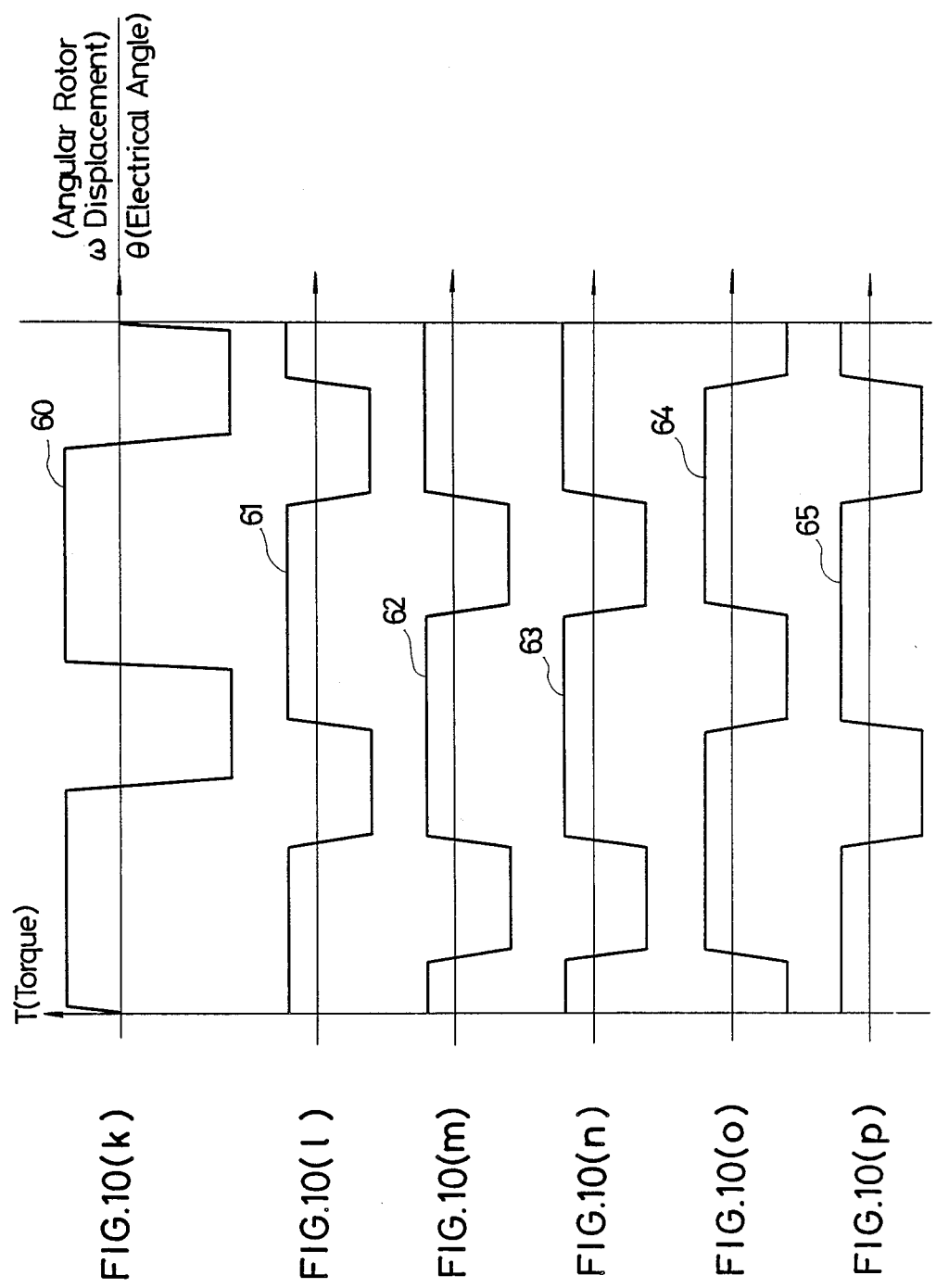

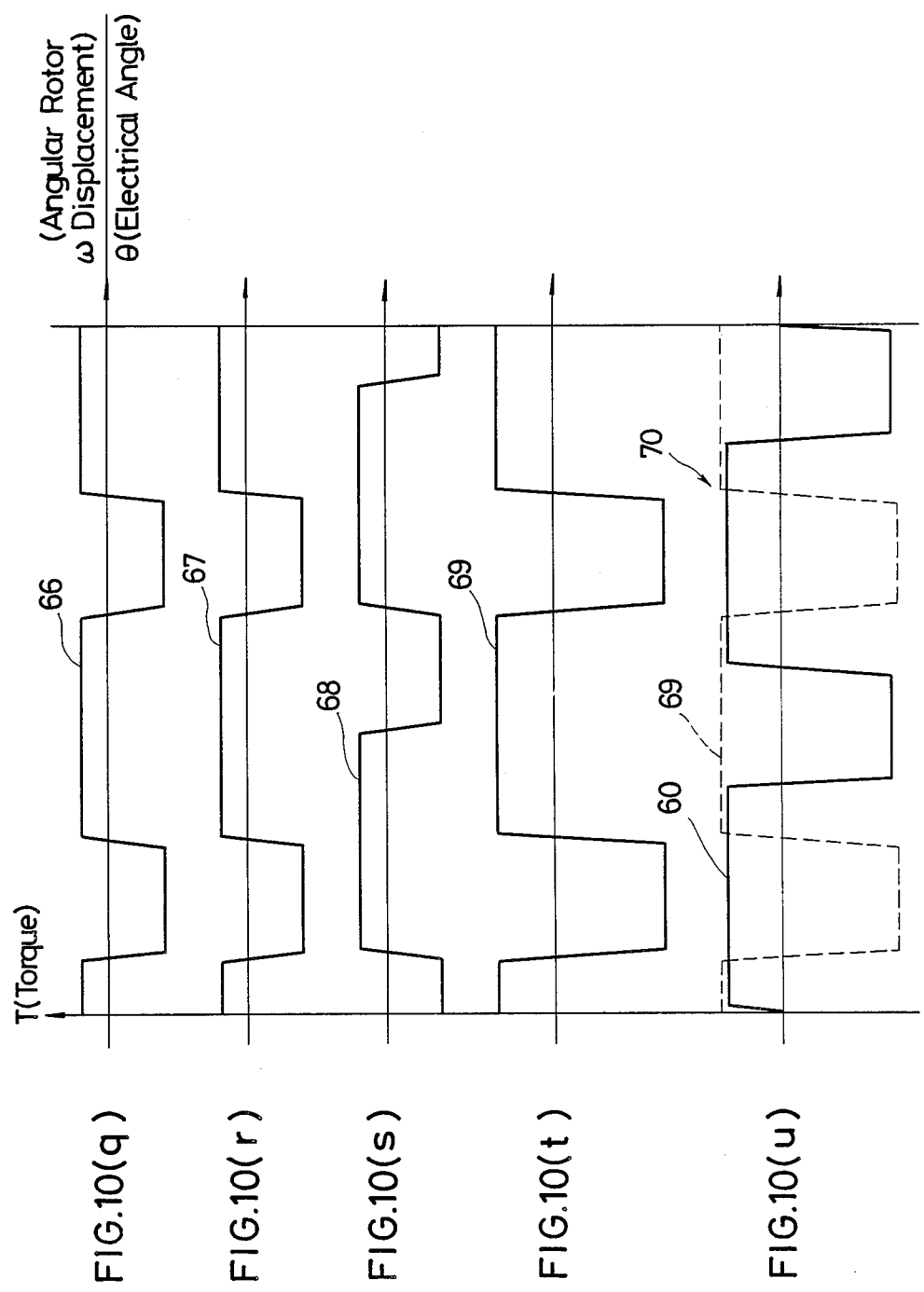

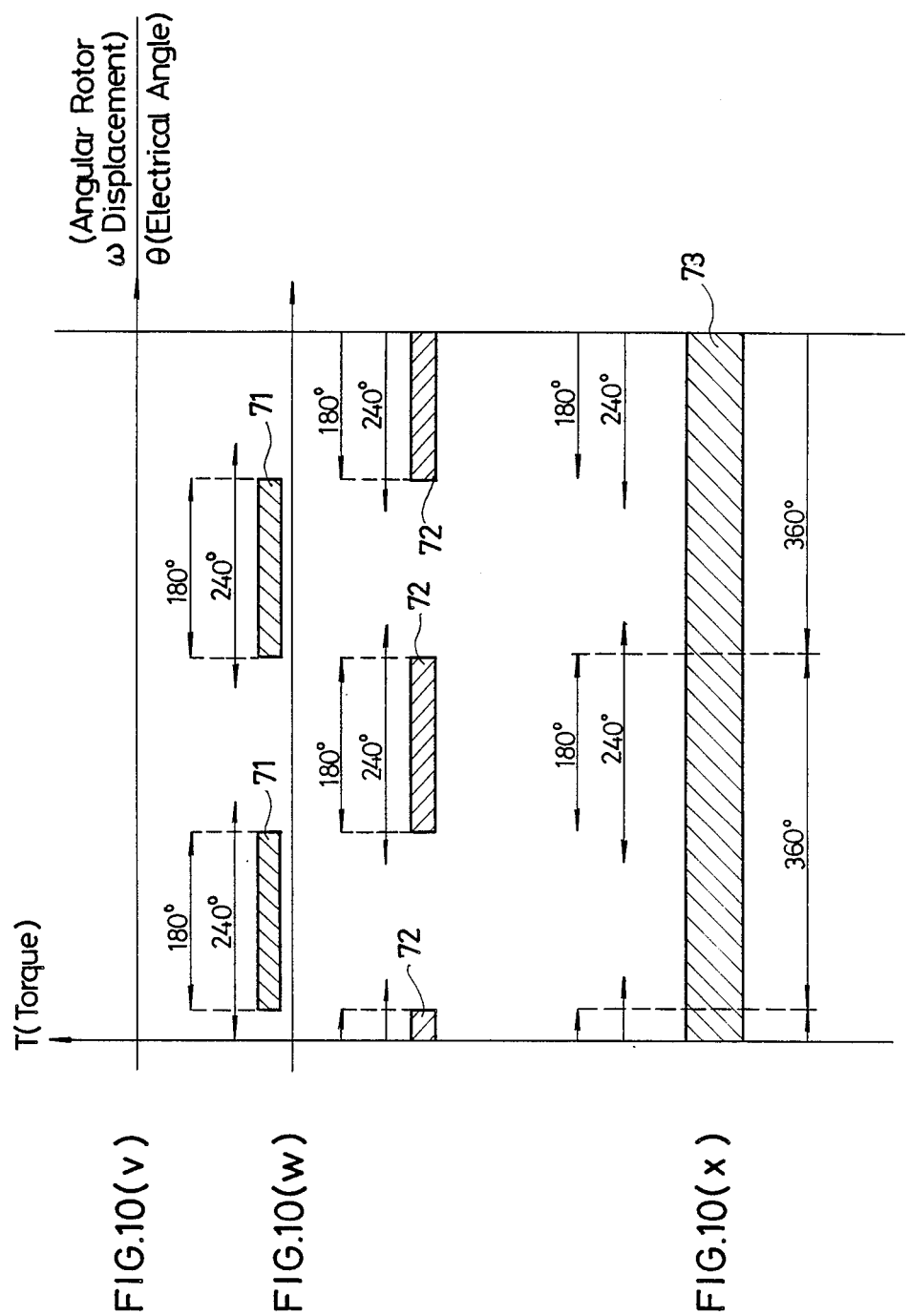

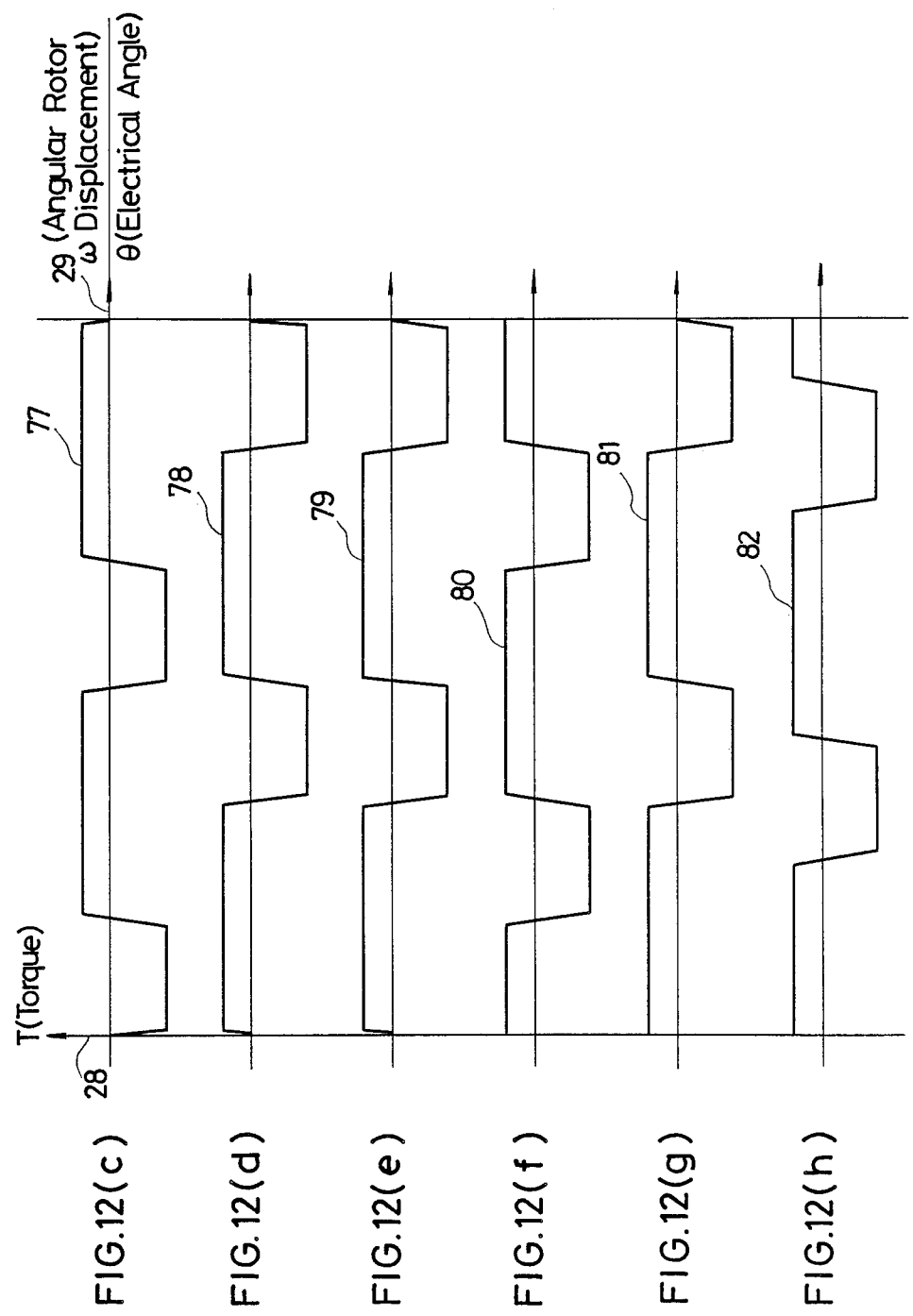

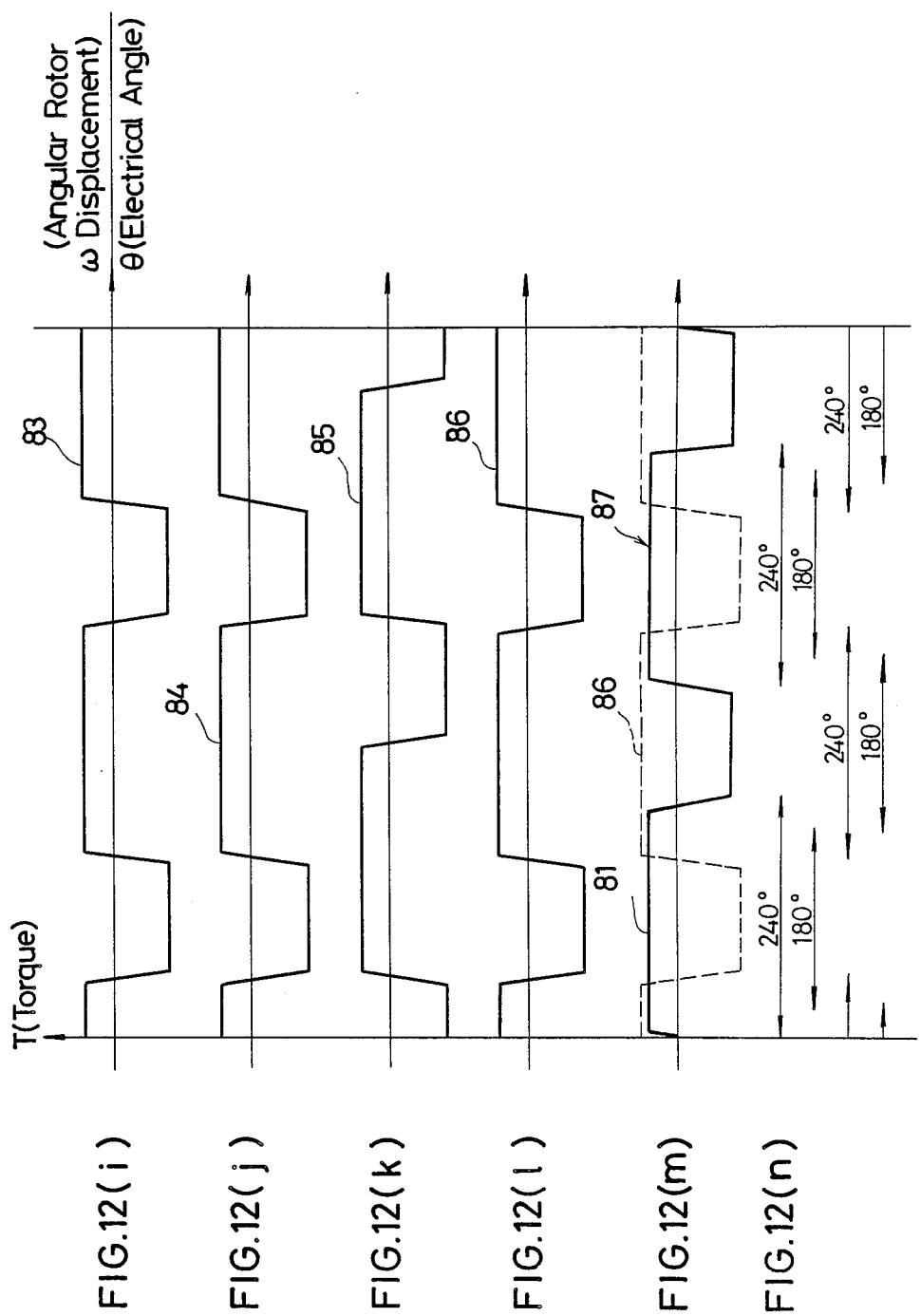

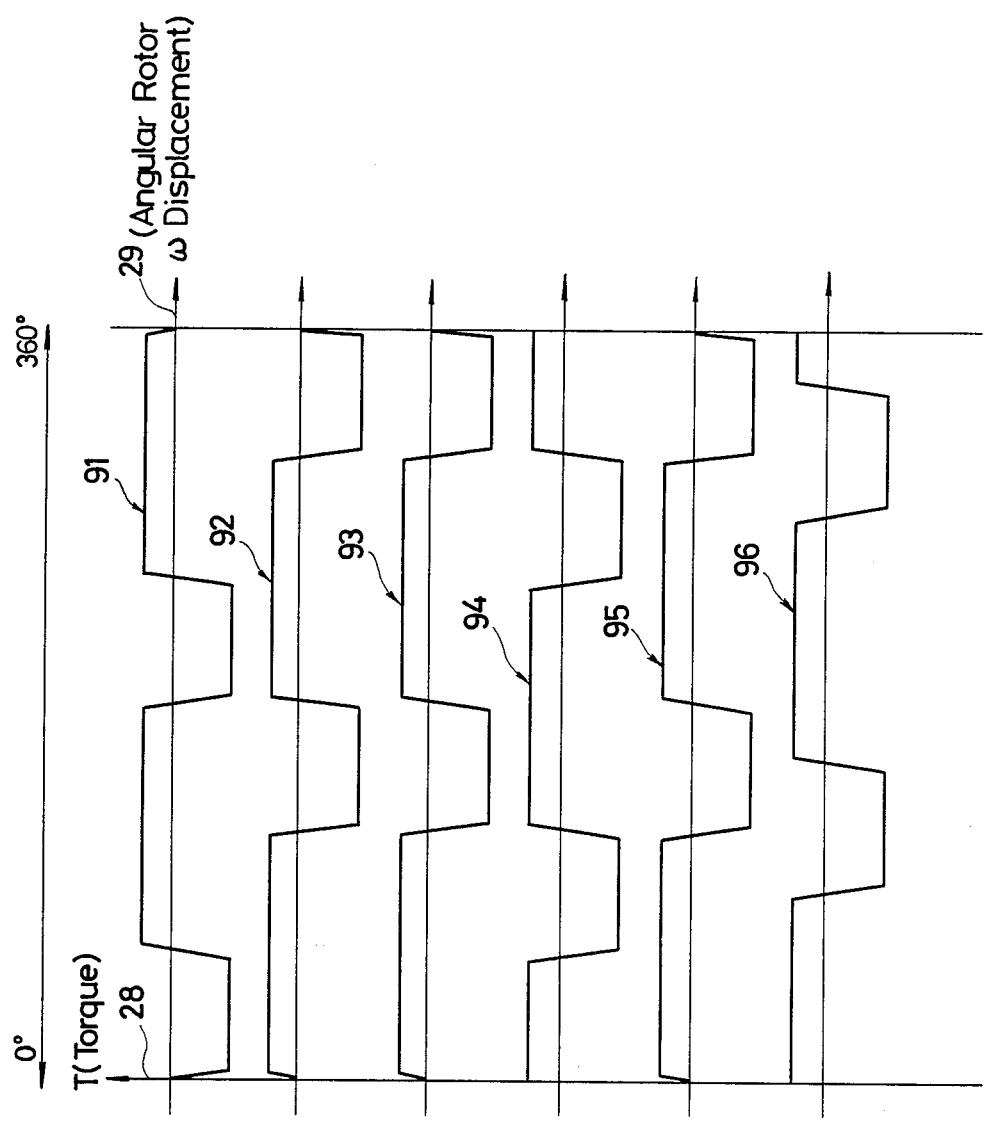

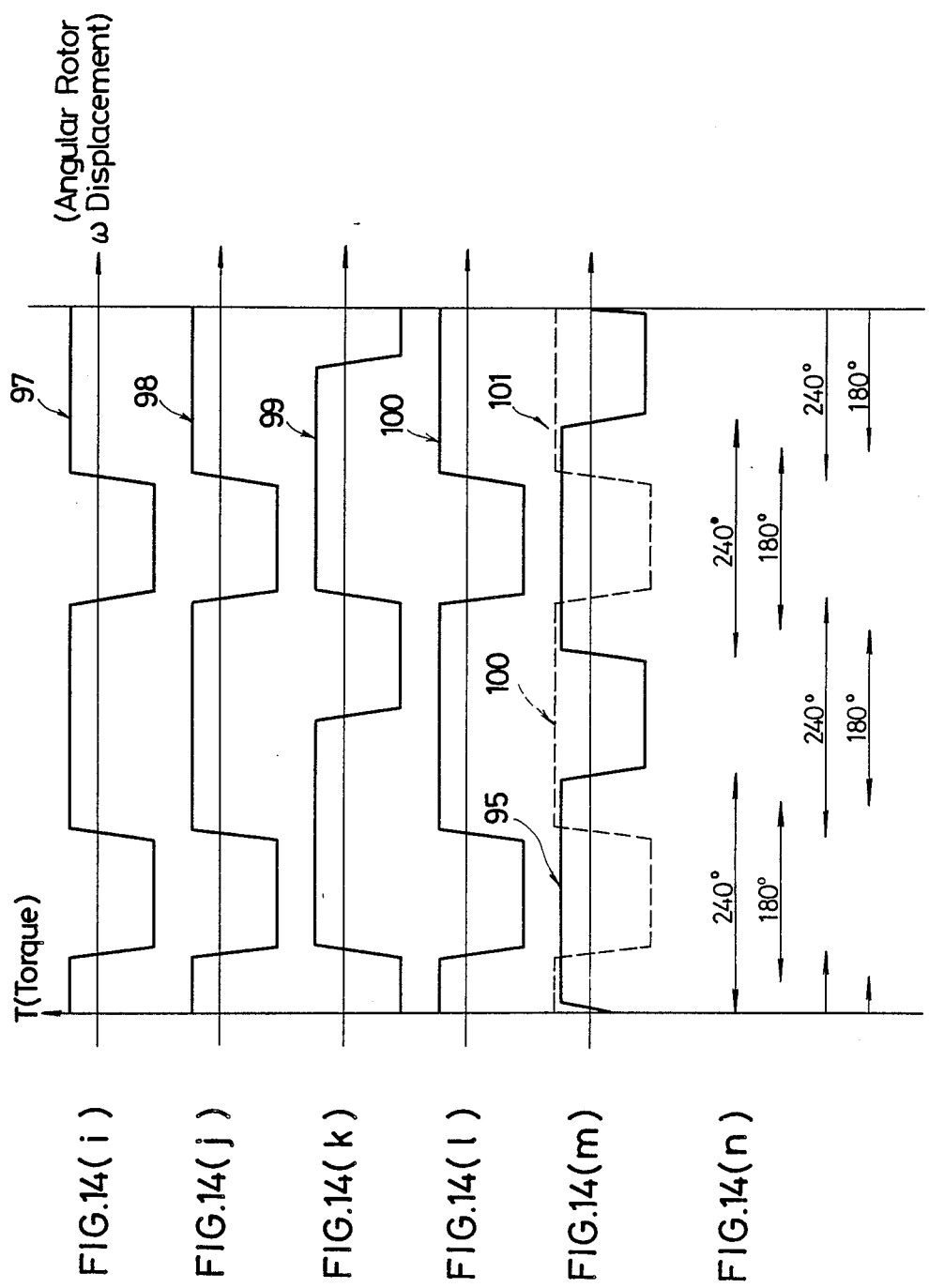

SINGLE-PHASE BRUSHLESS MOTOR WITH COGGING FEATURES

BACKGROUND OF THE INVENTION

1. Field of the Invention

This invention relates to a single-phase brushless motor which is well adapted for a spindle motor for a floppy disk drive, a motor for audio and video appliances, and a DC brushless axial-flow fan motor.

2. Description of the Prior Art

A brushless motor is used in a variety of appliances, owing to its advantages of low noise and long life, because it has neither brush nor commutator, in addition to its characteristics as a DC motor.

In a brushless motor, an electronic circuit is used to switch energization of armature coils of the motor and includes a driving circuit which necessarily includes a number of position detecting elements (normally, magnetic sensors such as Hall effect elements and Hall ICs are used) corresponding to the number of applicable phases of the motor. Accordingly, it is a drawback that as the number of phases increases, the production cost increases accordingly, due to such position detecting elements.

Therefore, inexpensive appliances such as axial-flow fans commonly employ a single-phase brushless motor which includes a driving circuit designed for a single-phase and hence can be produced at a low cost.

Such a single-phase brushless motor has a drawback that it cannot start itself if it stops at a dead point.

Therefore, a conventional single-phase brushless motor is normally provided with special means such as a cogging torque (reluctance torque) generating member such as an iron bar located in an air gap or a special stator armature providing a slanted or sloped air gap for generating a cogging torque to assure self-starting of a magnet rotor of the motor.

Such conventional single-phase brushless motors utilizing a cogging torque as described above have a drawback that smooth rotation cannot be attained due to generation of a high cogging torque. Besides, the brushles motor employing an iron bar has a relatively large number of parts while the brushless motor employing a special stator armature cannot provide a high turning torque and is low in efficiency.

Single phase brushless motors are also known wherein a non-magnetized zone (or a substantially non-magnetized zone) is formed on a driving field magnet. Brushless motors of this type have a drawback that it is difficult and troublesome to form such a non-magnetized zone, which is not suitable for mass production of brushless motors of the type.

SUMMARY OF THE INVENTION

It is an object of the present invention to provide a single-phase brushless motor which does not generate a high burdensome cogging torque for allowing self-starting of the motor, and can rotate smoothly with reduced torque ripples.

It is another object of the invention to provide a single-phase brushless motor wherein a high torque can be generated uniformly over an entire range of rotation of the motor with high efficiency.

In order to attain the objects, according to the present invention, there is provided a single-phase brushless motor, comprising a field magnet as a rotor having 2P (P is an integer equal to or greater than 1) alternate north and south magnetic pole zones, each of either the morth or the south magnetic pole zones of said field magnet having an angular width equal to an electrical angle of about 120 degrees while each of the other magnetic pole zones has an angular width equal to an electrical angle of about 240 degrees, a stator armature core having a plurality of stator poles formed thereon in an opposing relationship to said field magnet with an air gap left therebetween, a plurality of armature coils wound on said stator poles of said stator armature core and including first n (n is an integer equal to or greater than 1) armature coil or coils for the phase A wound on one or ones of said stator poles formed at a position or positions of an electrical angle of about $m \cdot (360 \cdot a)$ degrees (m is an integer equal to or greater than 0, and a is an integer equal to or greater than 1), second n armature coil or coils for the phase A wound in a reverse direction to that of said first armature coil or coils for the phase A on one or ones of said stator poles formed at a position or positions circumferentially spaced by an angular distance equal to an electrical angle of about $n \cdot (360 \cdot b - 240)$ degrees (b is an integer equal to or greater than 1) from the stator pole or poles on which said first armature coil or coils for the phase A are wound, third n armature coil or coils for the phase A' wound in the reverse direction to that of said first armature coil or coils for the phase A on one or ones of said stator poles formed at a position or positions circumferentially spaced by an angular distance equal to an electrical angle of about $n \cdot (360 \cdot b - 240)$ degrees from the stator pole or poles on which said first armature coil or coils are wound, fourth n armature coil or coils for the phase A' wound in the same winding direction as said first armature coil or coils for the phase A on one or ones of said stator poles formed at a position or positions circumferentially spaced by an angular distance equal to an electrical angle of about $n \cdot (360 \cdot c - 120)$ degrees (c is an integer equal to or greater than 1) from the stator pole or poles on which said first armature coil or coils for the phase A are wound, fifth n armature coil or coils for the phase B wound in the same winding direction as said first armature coil or coils for the phase A on one or ones of said stator poles formed at a position or positions circumferentially spaced by an angular distance equal to an electrical angle of about $n \cdot (360 \cdot d - 180)$ degrees (d is an integer equal to or greater than 1) from the stator pole or poles on which said first armature coil or coils for the phase A are wound, sixth n armature coil or coils for the phase B wound in the reverse direction to that of said first armature coil or coils for the phase A on one or ones of said stator poles formed at a position or positions circumferentially spaced by an angular distance equal to an electrical angle of about $n \cdot (360 \cdot e - 60)$ degrees (e is an integer equal to or greater than 1) from the stator pole or poles on which said first armature coil or coils for the phase A are wound, seventh n armature coil or coils for the phase B' wound in the reverse direction to that of said first armature coil or coils for the phase A on one or ones of said stator poles formed at a position or positions circumferentially spaced by an angular distance equal to an electrical angle of about $n \cdot (360 \cdot f - 180)$ degrees (f is an integer equal to or greater than 1) from the stator pole or poles on which said third armature coil or coils for the phase A' are wound, and eighth n armature coil or coils for the phase B' wound in the same winding direction as said first armature coil or coils for the phase A on one or ones of said stator poles formed at a position or positions circumferentially spaced by an angular distance equal to an electrical angle of about n·(360·g−180) degrees (g is an integer equal to or greater than 1) from the stator pole or poles on which said third armature coil or coils for the phase A' are wound, and an electric circuit for detecting the position of said field magnet to energize the armature coils for the phases A and A' and the armature coils for the phases B and B' alternately at an electric angle of 180 or about 180 degrees.

Thus, the single-phase brushless motor according to the present invention can have a generally uniform air gap because it does not make use of a cogging torque for allowing self-starting of the motor as in conventional single-phase brushless motors. Accordingly, single-phase brushless motors can be obtained which have a generally smooth torque characteristic over a wide output range and hence can rotate smoothly without torque irregularities caused by a cogging torque for allowing self-starting of such motors.

Besides, since the single-phase brushless motor according to the invention does not involve a sloped or slanted air gap, a high torque can be attained and the stator armature core can be made simple and formed easily. Accordingly, single-phase brushless motors particularly of the cored type can be very readily produced in a mass at a low cost.

Moreover, since there is no necessity of increasing the number of quantity of components as in conventional single-phase brushless motors of a coreless structure wherein a cogging torque generating part such as an iron bar is put in an air gap and since the armature coils can be wound using a conventional existing winder, single-phase brushless motors can be readily produced in a mass at a low cost, and a high torque can be advantageously obtained in such single-phase brushless motors.

In addition, the single-phase brushless motor according to the invention is further advantageous in that there is no necessity of forming a non-magnetized portion on the field magnet which deteriorates the mass-productivity of single-phase brushless motors.

The above and other objects, features and advantages of the present invention will become apparent from the following description and the appended claims, taken in conjunction with the accompanying drawings.

BRIEF DESCRIPTION OF THE DRAWINGS

FIGS. 10(a) to 10(x) are diagrammatic representations illustrating a principle of the single-phase brushless motor of FIG. 8, FIG. 10(a) being a developed view of a driving magnet rotor and a stator armatore core of the motor of FIG. 8. FIG. 10(b) being a developed view of stator coils of the stator armature core, FIGS. 10(c) to 10(u) being diagrams showing torque curves of the motor of FIG. 8, and FIGS. 10(v) to 10(x) being diagrammatic representations illustrating ranges of energization of the motor of FIG. 8;

DESCRIPTION OF THE PREFERRED EMBODIMENTS

Figure 1:
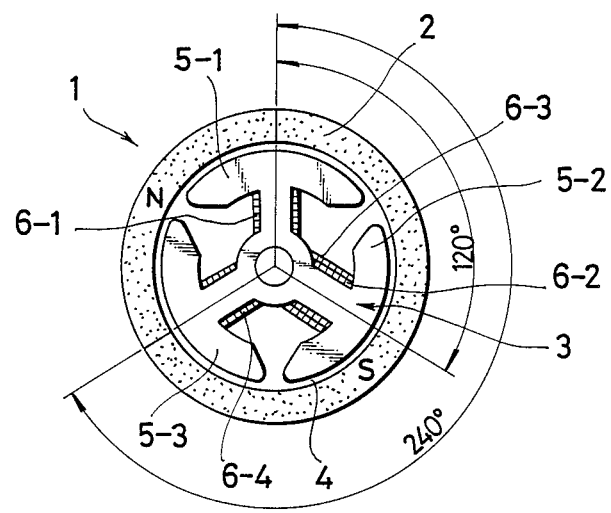
FIG. 1 is a schematic illustration of a single-phase brushless motor illustrating a principle of the present invention.

At first, a principle of the present invention will be described with reference to FIG. 1. A cupshaped, single-phase brushless motor 1 shown in FIG. 1 includes a 2-pole driving magnet rotor (field magnet) 2 and a stator armature core 3 having 3 radially extending T-shaped stator poles 5-1, 5-2, 5-3.

The 2-pole driving magnet rotor 2 has an N (north) magnetic pole or pole zone having an angular width equal to an electrical angle of about 120 degrees (equal in mechanical angle) and an S (south) magnetic pole or pole zone having an angular width equal to an electrical angle of about 240 degrees (equal in mechanical angle). The N and S magnetic pole zones of the driving magnet rotor 2 are magnetized in radial directions, and the ratio in angular width between the N and S pole zones is about 1:2.

The armature core 3 is located in an opposing relationship to the driving magnet rotor 2 with a radial air gap 4 left therebetween. The 3 T-shaped stator poles 5-1 5-2, 5-3 of the armature core 3 are circumferentially spaced by an angular distance equal to an electrical angle of about 60 degrees (120 degrees in mechanical angle) from each other.

The T-shaped stator pole 5-1 is formed at a position of an electrical angle of about m·360·a degrees (where m is an integer equal to or greater than 0, and a is an integer equal to or greater than 1; in the present embodiment, m=1 and a=1 are selected). A first armature coil 6-1 for the phase A is wound on the stator pole 5-1.

At a position circumferentially spaced by an angular distance equal to an electrical angle of about n·(360·b−240) degrees (where n and b are each an integer equal to or greater than 1; in the present embodiment, n=1 and b=1 are selected), that is, an electrical angle of about 120 degrees, from the position of the stator pole 5-1, the second stator pole 5-2 is formed. A second armature coil 6-2 for the phase A is wound on the stator pole 41-2 in a winding direction reverse to that of the first armature coil 6-1 for the phase A.

The first and second armature coils 6-1, 6-2 constitute an armature coil 6A for the phase A.

A third armature coil 6-3 for the phase A' is also wound on the stator pole 5-2 in a winding direction reverse to the first armature coil 6-1 for the phase A.

The third stator pole 5-3 is formed at a position circumferentially spaced by an angular distance equal to an electrical angle of about n·(360·c−120) degrees (where c is an integer equal to or greater than 1; in the present embodiment, c=1 is selected), that is, an electrical angle of about 240 degrees, from the position of the stator pole 5-1. A fourth armature coil 6-4 for the phase A' is wound on the stator pole 5-3 in a same winding direction with the first armature coil 6-1 for the phase A.

The third and fourth armature coils 6-3 and 6-4 constitute an armature coil 6A' for the phase A'.

A developed view of the single-phase brushless motor 1 having such a construction as described above is shown in FIG. 2(a), and FIG. 2(b) shows a developed view of the armature coils 6A, 6A' for the phases A, A'. Meanwhile, FIGS. 2(c) to 2(g) are diagrams showing torque curves generated by the armature coils 6A, 6A' of the single-phase brushless motor 1, and in those figures, the abscissa represents an angular displacement (ω) of the rotor of the motor 1 and the ordinate represents a torque (T). Further, FIG. 2(h) is a diagrammatic representation indicating ranges of the angular rotor displacement in electrical angle (θ) associated with FIGS. 2(c) to 2(g).

Figure 2A:
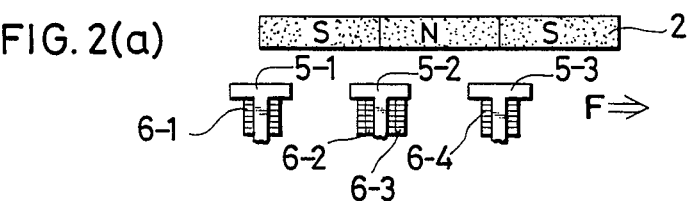
FIGS. 2(a) to 2(h) are diagrammatic representations illustrating the principle of the invention, FIG. 2(a) being a developed view of a driving magnet rotor and a stator armature core of the motor of FIG. 1, FIG. 2(b) being a developed view of stator coils of the stator armature core, FIGS. 2(c) to 2(g) being diagrams showing torque curves of the motor of FIG. 1, and FIG. 2(h) being a diagrammatic representation illustrating ranges of energization of the motor of FIG. 1.
Figure 2B:
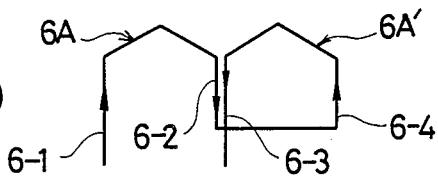
Figure 2C:
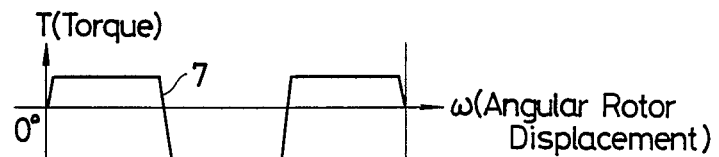
Figure 2D:
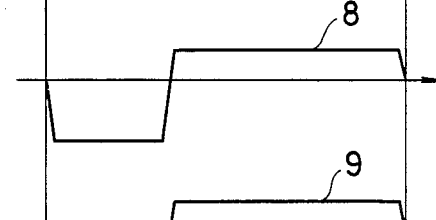
Figure 2E:
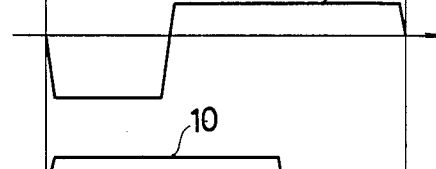
Figure 2F:
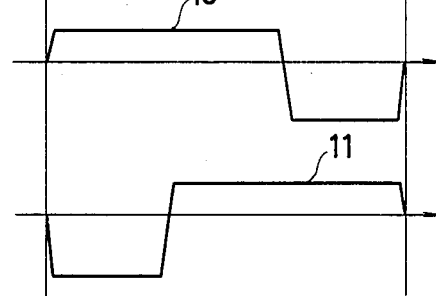
Figure 2G:
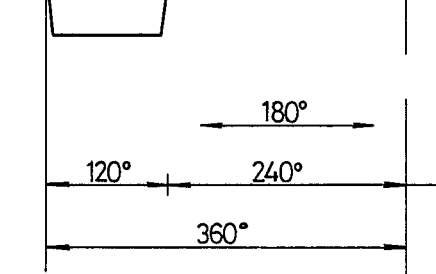
Figure 2H:
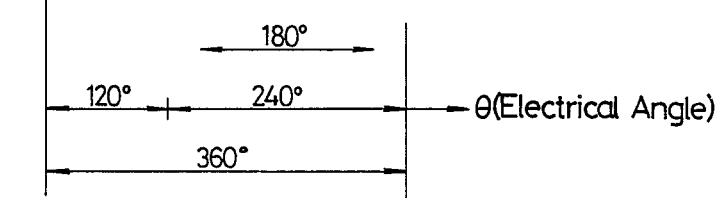

Referring to FIGS. 2(c) to 2(h), as the armature coils 6A, 6A' are energized, the magnet rotor 2 is moved in a direction indicated by an arrow mark F (FIG. 2(a)) relative to the armature coils 6A, 6A'. Thus, a torque curve 7 as shown in FIG. 2(c) is obtained by the first armature coil 6-1 for the phase A of the armature coil 6A.

Meanwhile, a torque curve 8 as shown in FIG. 2(d) is obtained by the second armature coil 6-2 of the armature coil 6A.

A torque curve 9 as shown in FIG. 2(e) is obtained by the third armature coil 6-3 of the armature coil 6A'.

A torque curve 10 as shown in FIG. 2(f) is obtained by the fourth armature coil 6-4 for the phase A' of the armature coil 6A'.

Accordingly, a composite torque curve 11 as shown in FIG. 2(g) is obtained from the torque curves 7 to 10.

As can be apparently seen from the composite torque curve 11, and referring also to FIG. 2(h), a uniform torque of a substantially fixed value in a forward direction is obtained over a range of an electrical angle of about 240 degrees during one full rotation (360 degrees in electrical angle) of the rotor of the motor 1, and a torque in the reverse direction is obtained over a range of the remaining electrical angle of about 120 degrees. The latter torque in the reverse direction does not contribute to rotation of the motor 1.

Such a composite torque curve 11 can be produced easily from a composite back EMF (electromotive force) waveform which is produced by combining a composite waveform between waveforms of back EMFs (electromotive forces) appearing in the first and second armature coils 6-1 and 6-2 of the armature coil 6A for the phase A with a composite waveform between waveforms of back EMFs produced in the third and fourth armature coils 6-3 and 6-4 of the armature coil 6A' for the phase A'. The composite torque curve 11 is actually obtained by inverting the composite back EMF waveform.

Accordingly, a torque for rotating the motor 1 will be obtained if the armature coils 6A, 6A' for the phases A, A' are energized over a range of an electrical angle of about 180 degrees within the range of the electrical angle of about 240 degrees of the composite back EMF waveform.

Thus, the positive torque, that is, the torque in the forward direction, in the composite torque curve 11 is made use of as a torque for the motor. However, only this could not constitute a single-phase brushless motor. In particular, the positive torque within the range of the electrical angle of about 240 degrees of the composite torque curve 11 of FIG. 2(h) can be made use of as a torque of the motor, but the negative torque, that is, the torque in the reverse direction, within the range of the remaining electrical angle of 120 or about 120 degrees cannot be made use of as a torque of the motor.

Therefore, in order to obtain a single-phase brushless motor which is driven by a torque over a full electrical angle of 360 degrees, additional armature coils for the phases B, B' similar to the armature coils for the phases A, A' may be provided at locations spaced by an angular distance equal to an electrical angle of about 180 degrees from the corresponding armature coils A, A' for the phases A, A', and the armature coils A, A' for the phases A, A' and the armature coils B, B' for the phases B, B' may be energized in an alternate relationship at intervals of an electrical angle of about 180 degrees. The single-phase brushless motor thus obtained can start itself without provision of a special self-starting enabling means (i.e., a cogging torque generating means; naturally, however, additional employment of such special means is allowed) and can generate a torque generally with reduced torque ripples over a complete rotation (over an electrical angle of 360 degrees) of the motor.

Now, a first embodiment of the present invention will be described with reference to FIGS. 3 to 7.

Figure 3:
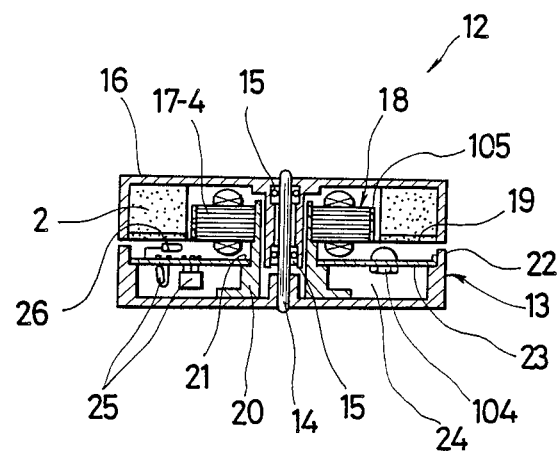
FIG. 3 is a vertical sectional view of a single-phase brushless motor according to a first embodiment of the invention.

Referring first to FIG. 3 which is a vertical sectional view of a generally cup-shaped cored single-phase brushless motor according to the first embodiment of the invention, the brushless motor is generally denoted at 12 and includes a generally cup-shaped motor body 13 formed from a stack of soft steel plates and constituting a stator. A rotary shaft 14 is supported for rotation at a substantially central portion of the motor body 13 by means of a pair of bearings 15.

A cup-shaped rotor yoke 16 is secured to the rotary shaft 14 within a range of the motor body 13. A cylindrical 2-pole magnet rotor 2 (same reference numeral 2 is used here because a like magnet rotor to the magnet rotor 2 of the motor 1 of FIG. 1 is employed) is secured to an inner circumferential face of the rotor yoke 16 while a stator armature core 18 is securely supported on a support stator 44 secured to the motor body 13 and is opposed to the magnet rotor 2 with a radial air gap 4 left therebetween. The stator armature core 18 has six T-shaped stator poles 17-1 to 17-6 extending radially from an annular central interconnecting portion 18a and circumferentially spaced by an equal electrical angle of about 60 degrees (same in mechanical angle) from each other as seen from FIG. 4.

Figure 5:
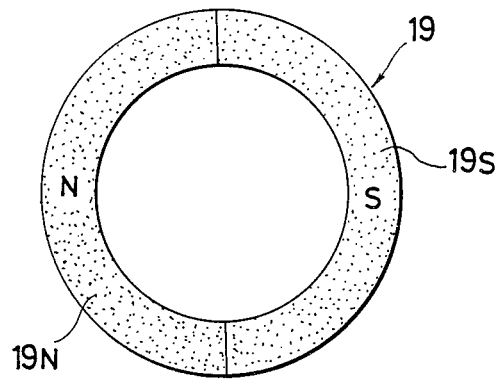
FIG. 5 is a bottom plan view of a position detecting magnet rotor used in the motor of FIG. 3.

An axially magnetized 2-pole position detecting magnet rotor 19 as shown in FIG. 5 is formed at, for example, by application to, a lower end of the magnet rotor 2. The position-detecting magnet rotor 19 has an N magnetic pole zone 19N and an S magnetic pole zone 19S each having an angular width equal to an electrical angle of about 180 degrees (same in mechanical angle).

It is to be noted that while in FIG. 3 the position-detecting magnet rotor 19 is shown applied directly to the lower end face of the driving magnet rotor 2, it may otherwise be applied thereto with a yoke interposed therebetween or alternatively it may be formed by axially magnetizing a lower end portion of the driving magnet rotor 2. It is to be noted that this also applies to any other embodiment of the invention described hereinbelow.

A printed circuit board 23 on which a printed wiring pattern is not shown is formed is securely supported in a horizontal position by an engaging shoulder 21 formed on the support stator 20 and another engaging shoulder 22 formed on the motor body 13. Thus, an electric part accommodating spacing 24 is formed between the printed circuit board 23 and the bottom of the motor body 13.

Electric parts 25 constituting an electric circuit are located on a lower face of the printed circuit board 23 within the electric part accommodating spacing 24. Meanwhile, a position-detecting element 26 constituted from a magnetic sensor such as a Hall effect element or a Hall IC is located on an upper face of the printed circuit board 23 opposing to the position-detecting magnet rotor 19 in order to detect a magnetic pole of the position-detecting magnet rotor 19.

Referring again to FIG. 4, a first armature coil 27-1 for the phase A is wound on each of the n (n is an integer equal to or greater than 1) stator poles formed at angular positions of about m·360·a ( m is an integer equal to or greater than 0, and a is an integer equal to or greater than 1; in the present embodiment m=1 and a=1 are selected) degrees in electrical angle. Since n=1 is selected here, a first coil 27-1 for the phase A is wound only on the stator pole 17-1 at an angular position of or about 360 degrees in electrical angle.

The one stator pole 17-3 (since n=1 is selected) is formed at a position circumferentially spaced by an angular distance equal to an electrical angle of about n—(360·b—240) (b is an integer equal to or greater than 1; in the present embodiment, n=1 and b=1 are selected) degrees, that is, an electrical angle of about 120 degrees, from the position of the stator pole 17-1. A second armature coil 27-2 for the phase A is wound on the stator pole 17-3 in a winding direction reverse to that of the first armature coil 27-1 for phase A.

The armature coils 27-1 and 27-2 constitute an armature coil 27A (refer to FIG. 6) for phase A.

A third armature coil 27-3 for the phase A' is also wound on the stator pole 17-3 in a reverse direction to that of the first armature coil 27-1 for the phase A.

The one stator pole 17-5 (since n=1 is selected) is formed at a position circumferentially spaced by an angular distance equal to an electrical angle of about n·(360·c — 120) (c is an integer equal to or greater than 1; in the present embodiment, n=1 and c=1 are selected) degrees, that is, an electrical angle of about 240 degrees in the present embodiment, from the position of the stator pole 17-1. A fourth armature coil 27-4 for phase A' is wound on the stator pole 17-5 in the same winding direction as the first armature coil 27-1 for phase A.

The armature coils 27-3 and 27-4 constitute an armature coil 27A' (refer to FIG. 6) for the phase A'.

It is to be noted that since the second armature coil 27-2 for phase A and the third armature coil 27-3 for phase A' are wound commonly on the stator pole 17-3 both in the reverse winding direction, they are described, for convenience of description, as if they were two separate armature coils, but they may be regarded actually as a single armature coil having a twice number of wound turns of a conductor.

The one stator pole 17-4 (since n=1 is selected) is formed at a position circumferentially spaced by an angular distance equal to an electrical angle of about n·(360·d — 180) (d is an integer equal to or greater than 1; in the present embodiment, n=1 and d=1 are selected) degrees, that is, an electrical angle of about 180 degrees, from the position of the stator pole 17-1 on which the first armature coil 27-1 for phase A is wound. A fifth armature coil 27-5 for phase B is wound on the stator pole 17-4 in the same winding direction as the first armature coil 27-1 for phase A.

The one stator pole 17-6 (since n=1 is selected) is formed at a position circumferentially spaced by an angular distance equal to an electrical angle of about n·(360·e — 60) (e is an integer equal to or greater than 1; in the present embodiment, n=1 and e=1 are selected) degrees, that is, an electrical angle of about 300 degrees in the present embodiment, from the position of the stator pole 17-1 on which the first armature coil 27-1 for phase A is wound. A sixth armature coil 27-6 for the phase B is wound on the stator pole 17-6 in the reverse winding direction to that of the first armature coil 27-1 for phase A.

The one stator pole 17-6 (since n=1 is selected in the present embodiment) is formed at a position circumferentially spaced by an angular distance equal to an electrical angle of about n·(360·f — 180) (f is an integer equal to or greater than 1) degrees, that is, an electrical angle of about 180 degrees because n=1 and e=1 are selected in the present embodiment, from the position of the stator pole 17-3 on which the third armature coil 27-3 is wound. A seventh armature coil 27-7 for phase B' is wound on the stator pole 17-6 in the reverse winding direction to that of the first armature coil 27-1 for phase A.

An eighth armature coil 27-8 for the phase B' is wound in the same winding direction as the first armature coil 27-1 for phase A on the stator pole 17-2 which is formed at a position circumferentially spaced by an angular distance equal to an electrical angle of about n·(360·g−180) (g is an integer equal to or greater than 1; in the present embodiment, n=1 and g=1 are selected) degrees, that is, an electrical angle of about 180 degrees, from the position of the stator pole 17-5 on which the fourth armature coil 27-4 for phase A' is wound, or in other words, at a position circumferentially spaced by an angular distance equal to an electrical angle of about 60 degrees from the stator pole 17-1.

The fifth and sixth armature coils 27-5 and 27-6 for the phase B constitute an armature coil 27B for the phase B (refer to FIG. 6).

The seventh and eighth armature coils 27-7 and 27-8 for phase B' constitute an armature coil 27B' for phase B' (refer to FIG. 6).

It is to be noted that since the sixth armature coil 27-6 for phase A and the seventh armature coil 27-7 for phase B' are wound commonly on the stator pole 17-6 both in the reverse winding direction, they are described, for convenience of description, as if they were two separate armature coils, but they may be regarded actually as a single armature coil having a twice number of wound turns of a conductor.

In order to eliminate a high cogging torque from being generated by the stator poles 17-1 to 17-6 and the driving magnet rotor 2, a magnetic member 105 in the form of a ring having a small radial thickness is secured to outer peripheral portions of the stator poles 17-1 to 17-6 of the stator armature core 18 using a suitable means such as, for example, adhesion. While the term "secured" is used here, the magnetic member 105 may anyway be formed in an integral relationship with the stator poles. It is to be noted that the magnetic member 105 can be omitted where a high cogging torque is not involved. This also applies to any other embodiment of the invention described hereinbelow.

Figure 6A:
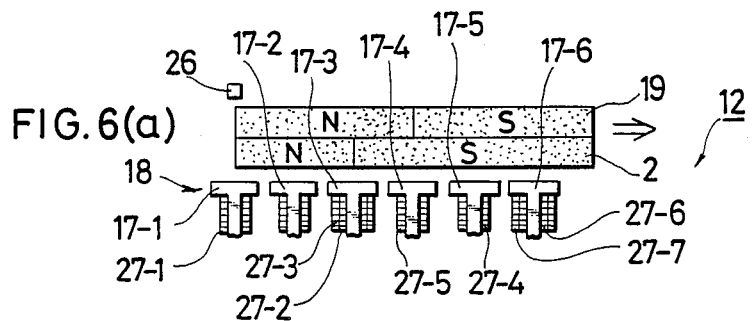
FIGS. 6(a) to 6(o) are diagrammatic representations illustrating a principle of the single-phase brushless motor of FIG. 3, FIG. 6(a) being a developed view of a driving magnet rotor and a stator armature core of the motor of FIG. 3, FIG. 6(b) being a developed view of stator coils of the stator armature core, FIGS. 6(c) to 6(m) being diagrams showing torque curves of the motor of FIG. 3, and FIGS. 6(n) and 6(o) being diagrammatic representations illustrating ranges of energization of the motor of FIG. 3.
Figure 6B:
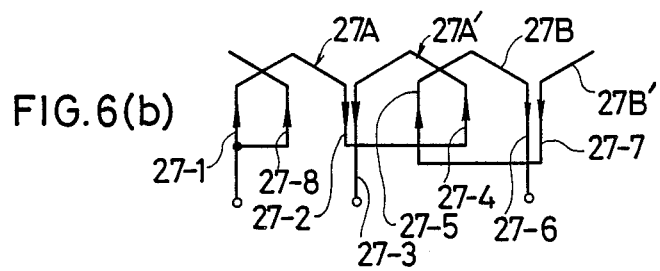

A developed view of the driving magnet rotor 2 and the stator armature core 18 of the cored single-phase brushless motor 12 is shown in FIG. 6(a), and FIG. 6(b) shows a developed view of the armature coils 27A, 27A', 27B and 27B' for phases A, A', B and B'. Meanwhile, FIGS. 6(c) to 6(m) are diagrams showing torque curves generated by the armature coils 27A, 27A', 27B, 27B' of the cored single-phase brushless motor 12, and in those figures, the ordinate 28 represents a torque (T) and the abscissa 29 represents an angular displacement (ω) of the magnet rotor 2 of the motor 12. Further, FIGS. 6(n) and 6(o) are diagrammatic representations indicating ranges of the angular rotor displacement in electrical angle (θ) associated with FIGS. 6(c) to 6(m).

Figure 6C:
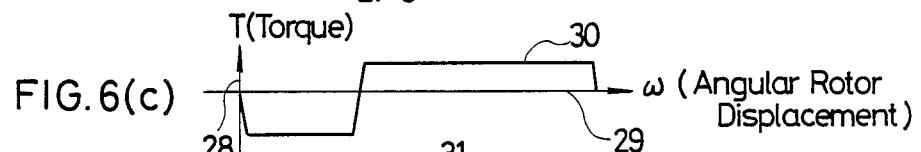

Referring to FIGS. 6(c) to 6(m), as the armature coils 27A, 27A' for phases A, A' are energized, driving magnet rotor 2 is moved in a direction indicated by an arrow mark F (FIG. 6(a)) relative to the stator armature core 18. Thus, a torque curve 30 as shown in FIG. 6(c) is obtained by first armature coil 27-1 of the armature coil 27A for the phase A.

Figure 6D:
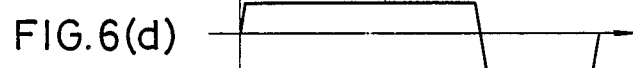

Meanwhile, a torque curve 31 as shown in FIG. 6(d) is obtained by the second armature coil 27-2 for phase A.

Figure 6E:
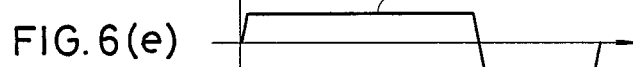

A torque curve 32 as shown in FIG. 6(e) is obtained by the third armature coil 27-3 of the armature coil 27A' for phase A'.

Figure 6F:
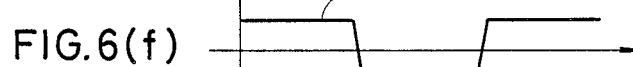

A torque curve 33 as shown in FIG. 6(f) is obtained by the fourth armature coil 27-4 for phase A'.

Figure 6G:
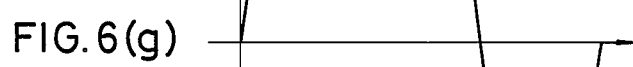

Thus, by combining the torques as shown by the torque curves 30 to 33 in FIGS. 6(c) to 6(f), a composite torque curve 34 as shown in FIG. 6(g) is obtained.

Figure 6H:
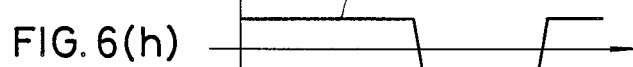

Meanwhile, as the armature coils 27B, 27B' for phases B, B' are energized, driving magnet rotor 2 is moved in a direction indicated by the arrow mark F (FIG. 6(a)) relative to the stator armature core 18. Thus, a torque curve 35 as shown in FIG. 6(h) is obtained by the fifth armature coil 27-5 of the armature coil 27B for phase B.

Figure 6I:

Meanwhile, a torque curve 36 as shown in FIG. 6(i) is obtained by the sixth armature coil 27-6.

A torque curve 37 as shown in FIG. 6(j) is obtained by the seventh armature coil 27-7 of the armature coil 27B' for phase B'.

A torque curve 38 as shown in FIG. 6(k) is obtained by the eighth armature coil 27-8 for phase B'.

Thus, by combining the torques as show by the torque curves 35 to 38 in FIGS. 6(h) to 6(k), a composite torque curve 39 as shown in FIG. 6(l) is obtained.

Accordingly, by combining the torque curves 34 and 39 shown in FIGS. 6(g) and 6(l), a composite torque curve 40 as shown in FIG. 6(m) is obtained.

The composite torque curve 40 shown in FIG. 6(m) includes a solid line representation of the composite torque curve 34 of FIG. 6(g) obtained by the armature coils 27A, 27A' for the phases A, A', and a broken line representation of the composite torque curve 39 of FIG. 6(l) obtained by the armature coils 27B, 27B' for phases B, B'. In order to facilitate discrimination of the curves 34, 39, the composite torque curve 40 includes the solid and broken line representations of the curves 34, 39 displaced or offset a little from each other.

As apparently seen from FIGS. 6(m) to 6(o), a torque which is uniform over a range of an electrical angle of 360 degrees with smooth ripples can be obtained.

Thus, a smooth torque can be obtained over a range of an electrical angle of 360 degrees by the single-phase brushless motor 12 which includes the only one position-detecting element 26. Accordingly, the single-phase brushless motor 12 can start itself and can rotate a full rotation and continue its rotation.

In particular, as apparently seen from FIGS. 6(m) and 6(n), two positive torques, that is, torques in the forward direction, are obtained over different ranges of an electrical angle of about 240 degrees from the composite torque curves 34 and 39, and thus a positive torque is obtained over a range of an electrical angle of 360 degrees as a whole from the two torques.

Accordingly, by energizing the armature coils 27A, 27A' for the phases A, A' over a range of an electrical angle of about 180 degrees which is a central flat portion of the composite torque curve 34 within the range of the electrical angle of about 240 degrees and which is indicated by a range 41 hatched with rightwardly upwardly inclined lines in FIG. 6(o), a positive torque can be obtained corresponding to the hatched range 41.

Further, by energizing the armature coils 27B, 27B' for phases B, B' over a range of an electrical angle of about 180 degrees which is a central flat portion of the composite torque curve 39 within the range of the electrical angle of about 240 degrees and which is indicated by a range 42 hatched with leftwardly upwardly inclined lines in FIG. 6(o), a positive torque can be obtained corresponding to the hatched range 42.

Accordingly, a torque in the forward direction which is flat and uniform over a range of an electrical angle of 360 or about 360 degrees can be obtained, and hence the single-phase brushless motor 12 can rotate continuously.

It is to be noted that portions 43-1, 43-2 in which hatching lines cross each other indicate unstable ranges over which the torques of the composite torque curves 34 and 39 overlap each other, and hence such ranges of an electrical angle of 360 degrees in which the torque is stable are selected.

Figure 7:
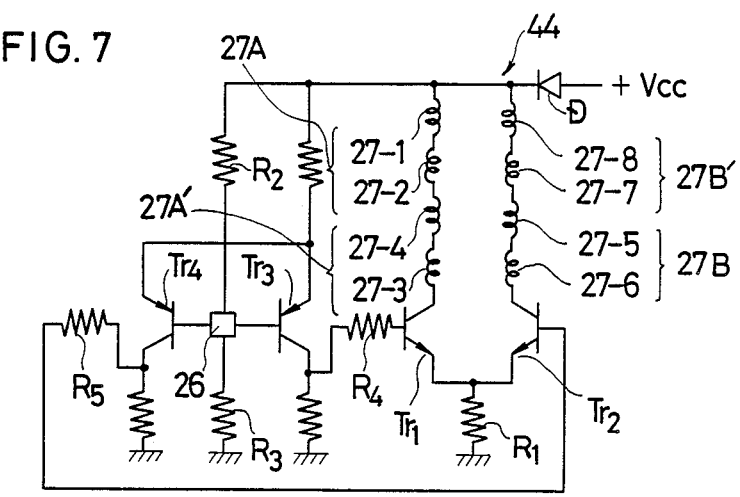
FIG. 7 is a circuit diagram of a driving circuit incorporated in the single-phase brushless motor of FIG. 3.

Referring now to FIG. 7, a driving circuit 44 is shown as an example.

In the driving circuit 44 of FIG. 7, the armature coils 27A and 27A' for phases A and A' are shown connected in series, and one end of the armature coil 27A (the first armature coil 27-1) is connected to a positive power supply +Vcc via a diode D while the other end of armature coil 27A' for phase A' (an end of the second armature coil 27-3) is connected to the collector of a transistor Tr1.

The armature coils 27B and 27B' for the phases B and B' are also connected in series, and one end of the armature coil 27B' for phase B' (eighth armature coil 27-8) is connected to the positive power supply +Vcc via the diode D and also to the one end of the first armature coil 27-1 while the other end of the armature coil 27B for phase B (sixth armature coil 27-6) is connected to the collector of a transistor Tr2.

The emitters of the transistors Tr1 and Tr2 are connected in common to the ground via a resistor R1.

A positive power terminal of the position-detecting element 26 is connected to the positive power supply +Vcc via a resistor R2 and the diode D, and a negative power terminal of the position-detecting element 26 is connected to the ground via another resistor R3.

An output terminal of position-detecting element 26 is connected to the base of the transistor Tr1 via another transistor Tr3 and a resistor R4, and another output terminal of position-detecting element 26 is connected to the base of the transistor Tr2 via a further transistor Tr4 and a further resistor R5.

It is to be noted that since resistances of the driving circuit 44 are selected such that both transistors Tr3, Tr4 may be switched on even when the position-detecting element 26 detects a boundary between an N pole zone and an S pole zone of the driving magnet rotor 2, armature coils 27A, 27A' for phases A, A' and armature coils 27B, 27B' for phases B, B' are selectively energized at any time in response to a signal from the position-detecting element 26 thereby to assure rotation of the single-phase brushless motor 12 at any time.

Further in the driving circuit 44, when the position-detecting element 26 detects the S pole zone 19S of the position-detecting magnet rotor 19, the transistor Tr3 is switched on to energize the armature coils 27A, 27A' for phases A, A' for an interval equal to an electrical angle of 180 degrees. On the contrary, when the position-detecting element 26 detects the N pole zone 19N, the transistor Tr4 is switched on to energize the armature coils 27B, 27B' for the phases B, B' for an interval equal to an electrical angle of 280 degrees. Accordingly, a uniform torque is obtained over a range of an electrical angle of 360 degrees.

It is to be noted that, as apparent from the foregoing description, while the single-phase brushless motor 12 according to the present invention can start itself without provision of a self-starting enabling means such as a cogging torque generating means, it may additionally include a self-starting enabling means for assuring self-starting of the motor. For example, a reluctance torque generating part such as an iron rivet may be provided in an opposing relationship to the position-detecting magnet rotor 19 at a position indicated by reference numeral 104 in FIG. 3.

It is to be noted that the coggingless single-phase brushless motor 12 of the radial air gap type according to the first embodiment of the invention can start itself in spite of the single-phase energization system and can generate a high torque, due to its cored structure, but even though it includes the stator poles 17-1 to 17-6 therein, cogging torque having a bad influence on the motor will scarcely appear in the motor, owing to the presence of the magnetic member 105 in the form of a ring, or if the magnetic member 105 is designed appropriately, the motor can be of a coggingless motor.

Now, a cored single-phase brushless motor according to a second embodiment of the present invention will be described with reference to FIG. 8. It is to be noted that an expression "of about . . . " for a numerical value will be omitted in the following description.

The single-phase brushless motor generally denoted at 45 includes a stator armature core 46 having a central annular connecting portion 46a and 12 T-shaped stator poles 47-1 to 47-12 extending radially outwardly from the central annular connecting portion 46a and formed in a circumferentially equidistantly spaced relationship by an electrical angle of 60 degrees (30 degrees in mechanical angle). The single-phase brushless motor 45 further includes a 4-pole driving magnet rotor 49 mounted for rotation in an opposing relationship to the stator armature core 46 with a radial air gap 48 left therebetween.

The driving magnet rotor 49 has a pair of N magnetic poles or pole zones each having an angular width equal to an electrical angle of 120 degrees (60 degrees in mechanical angle), and a pair of S magnetic poles or pole zones each having an angular width equal to an electrical angle of 240 degrees (120 degrees in mechanical angle). The N and S magnetic pole zones are arranged alternately on the driving magnet rotor 49.

A 4-pole position detecting magnet rotor 50 is formed at an end face of the driving magnet rotor 49 and has a pair of N magnetic poles or pole zones 50N each having an angular width equal to an electrical angle of 180 degrees (90 degrees in mechanical angle) and a pair of S magnetic poles or pole zones 50S arranged in an alternate relationship with the N magnetic pole zones 50N and each having an angular width equal to an electrical angle of 180 degrees (90 degrees in mechanical angle).

Figure 8:
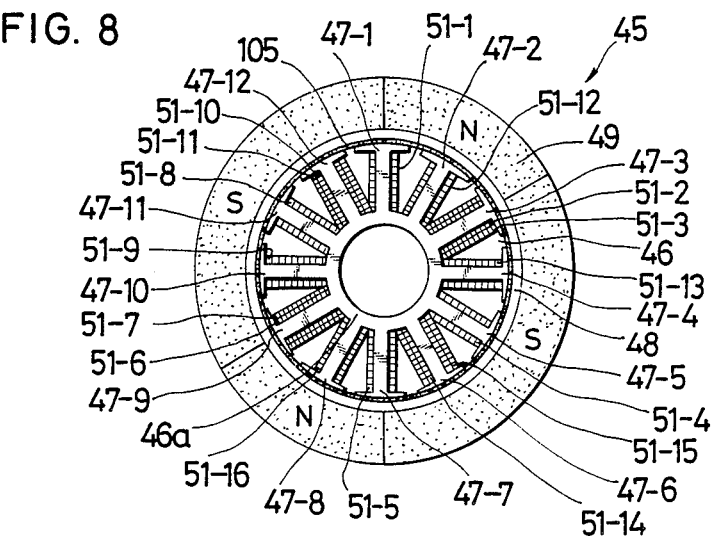
FIG. 8 is a schematic illustration of a single-phase brushless motor according to a second embodiment of the invention.
Figure 9:
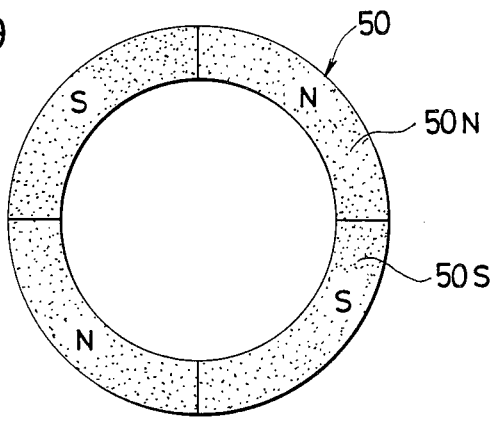
FIG. 9 is a bottom plan view of a position detecting magnet rotor used in the motor of FIG. 8.

Referring now to FIGS. 8 and 10(a), a first armature coil 51-1 is wound on the stator pole 47-1 formed at a circumferential position of an electrical angle of m·360·a degrees (0 degrees in electrical angle, since m=0 is selected in the present embodiment; 0 degrees in mechanical angle).

A second armature coil 51-2 for the phase A is wound in a reverse direction to that of the first armature coil 51-1 for phase A on the stator pole 47-3 formed at a position circumferentially spaced by an angular distance equal to an electrical angle of 120 degrees (60 degrees in mechanical angle) from the position of the stator pole 47-1 in a direction indicated by an arrow mark X in FIG. 10(a).

A third armature coil 51-3 for phase A' is wound also on the stator pole 47-3 in the reverse direction to that of first armature coil 51-1 for phase A.

A fourth armature coil 51-4 for the phase A' is wound in the same winding direction as the first armature coil 51-1 for the phase A on the stator pole 47-5 formed at a position circumferentially spaced by an angular distance equal to an electrical angle of $n \cdot (360 \cdot c - 120)$ degrees (in the present embodiment, $n=1$ and $c=1$ are selected), that is, 240 degrees (120 degrees in mechanical angle), from the position of the stator pole 47-1 in the direction of the arrow mark X of FIG. 10(a).

A fifth armature coil 51-1 for the phase A is wound in the same winding direction as first armature coil 51-1 for phase A on the stator pole 47-7 formed at a position circumferentially spaced by an angular distance equal to an electrical angle of $m \cdot 360 \cdot a$ degrees (in the present embodiment, $m=1$ and $a=1$ are selected), that is, 360 degrees (180 degrees in mechanical angle), from the position of the stator pole 47-1 in the direction of the arrow mark X of FIG. 10(a).

A sixth armature coil 51-6 for phase A is wound in the reverse winding direction to that of the first armature coil 51-1 for the phase A on the stator pole 47-9 formed at a position circumferentially spaced by an angular distance equal to an electrical angle of $n \cdot (360 \cdot b - 240)$ degrees (in the present embodiment, $n=4$ and $b=1$ are selected), that is, 480 degrees (240 degrees in mechanical angle), from the position of the stator pole 47-1 in the direction of the arrow mark X of FIG. 10(a).

A seventh armature coil 51-7 for the phase A' is also wound on the stator pole 47-9 in the winding direction opposite to that of the first armature 51-1 for phase A.

An eighth armature coil 51-8 for the phase A' is wound in the same winding direction as the first armature coil 51-1 for phase A on stator pole 47-11 formed at a position circumferentially spaced by an angular distance equal to an electrical angle of $n \cdot (360 \cdot b - 240)$ degrees (in the present embodiment, $n=5$ and $b=1$ are selected), that is, 600 degrees (300 degrees in mechanical angle), from the position of the stator pole 47-1 in the direction of the arrow mark X of FIG. 10(a).

A ninth armature coil 51-9 for the phase B is wound in the reverse winding direction to that of the first armature coil 51-1 for the phase A on the stator pole 47-10 formed at a position circumferentially spaced by an angular distance equal to an electrical angle of $n \neq (360 \cdot d - 180)$ degrees (in the present embodiment, $n=1$ and $d=1$ are selected), that is, 180 degrees (90 degrees in mechanical angle), from the position of the stator pole 47-1 in a direction indicated by an arrow mark Y in FIG. 10(a).

A tenth armature coil 51-10 for phase B is wound in the reverse winding direction to that of the first armature coil 51-1 for phase A on the stator pole 47-12 formed at a position circumferentially spaced by an angular distance equal to an electrical angle of $n \cdot (360 \cdot e - 180)$ degrees (in the present embodiment, $n=3$ and $e=1$ are selected), that is, 540 degrees (270 degrees in mechanical angle), from the position of the stator pole 47-3 in the direction of the arrow mark X in FIG. 10(a).

An 11th armature coil 51-11 for phase B' is also wound on the stator pole 47-12 in the reverse winding direction to that of the first armature coil 51-1 for phase A.

A 12th armature coil 51-12 for phase B' is wound in the same winding direction as first armature coil 51-1 for phase A on the stator pole 47-2 formed at a position circumferentially spaced by an angular distance equal to an electrical angle of $n \cdot (360 \cdot g - 240)$ degrees (in the present embodiment, $n=1$ and $g=1$ are selected), that is, 120 degrees (60 degrees in mechanical angle), from the position of the stator pole 47-12 in the direction of the arrow mark X in FIG. 10(a) or in other words at a position circumferentially spaced by an angular distance equal to an electrical angle of 60 degrees (30 degrees in mechanical angle) from the position of the stator pole 47-1 in the direction of the arrow mark X in FIG. 10(a).

A 13th armature coil 51-13 for phase B is wound in the same winding direction as the first armature coil 51-1 for phase A on stator pole 47-4 formed at a position circumferentially spaced by an angular distance equal to an electrical angle of $n \cdot (360 \cdot d - 180)$ degrees (in the present embodiment, $n=1$ and $d=1$ are selected), that is, 180 degrees (90 degrees in mechanical angle), from the position of the stator pole 47-1 in the direction of the arrow mark X in FIG. 10(a).

A 14th armature coil 51-14 for phase B is wound in the reverse winding direction to that of the first armature coil 51-1 for phase A on stator pole 47-6 formed at a position circumferentially spaced by an angular distance equal to an electrical angle of $m \cdot 360 \cdot a$ degrees (in the present embodiment, $m=1$ and $a=1$ are selected), that is, 360 degrees (180 degrees in mechanical angle), from the position of the stator pole 47-12 in the direction of the arrow mark X in FIG. 10(a).

A 15th armature coil 51-15 for phase B' is also wound on the stator pole 47-6 in the reverse winding direction to that of the first armature coil 51-1 for phase A.

A 16th armature coil 51-16 for the phase B' is wound in the same winding direction as first armature coil 51-1 for phase A on the stator pole 47-8 formed at a position circumferentially spaced by an angular distance equal to an electrical angle of $m \cdot 360 \cdot a$ degrees (in the present embodiment, $m=1$ and $a=1$ are selected), that is, 360 degrees (180 degrees in mechanical angle), from the position of the stator pole 47-2 in the direction of the arrow mark X in FIG. 10(a).

The armature coils 51-1 and 51-2 constitute an armature coil 51A-1 for phase A (refer to FIG. 10(b).

The armature coils 51-5 and 51-6 constitute an armature coil 51A-2 for phase A (refer to FIG. 10(b).

The armature coils 51-3 and 51-4 constitute an armature coil 51A'-1 for phase A' (refer to FIG. 10(b).

The armature coils 51-7 and 51-8 constitute an armature coil 51A'-2 for phase A' (refer to FIG. 10(b).

The armature coils 51-9 and 51-10 constitute an armature coil 51B-1 for phase B (refer to FIG. 10(b).

The armature coils 51-13 and 51-14 constitute an armature coil 51B-2 for phase B (refer to FIG. 10(b).

The armature coils 51-11 and 51-12 constitute an armature coil 51B'-1 for phase B' (refer to FIG. 10(b).

The armature coils 51-15 and 51-16 constitute an armature coil 51B'-2 for phase B' (refer to FIG. 10(b).

It is to be noted that since the second armature coil 51-2 for phase A and third armature coil 51-3 for phase A' are wound commonly on stator pole 47-3 both in the reverse winding direction to that of first armature coil 51-1 for phase A, they are described, for convenience of description, as if they were two separate armature coils, but they may be regarded actually as a single armature coil having a twice number of wound turns of a conductor.

It is also to be noted that since the sixth armature coil 51-6 for phase A and seventh armature coil 51-7 for phase A' are wound commonly on the stator pole 47-9 both in the reverse winding direction to that of the first armature coil 51-1 for phase A, they are described, for convenience of description, as if they were two separate armature coils, but they may be regarded actually as a single armature coil having a twice number of wound turns of a conductor.

Further, since the tenth armature coil 51-10 for phase B and 11th armature coil 51-11 for phase B' are wound commonly on the stator pole 47-12 both in the reverse winding direction to that of the first armature coil 51-1 for the phase A, they are described, for convenience of description, as if they were two separate armature coils, but they may be regarded actually as a single armature coil having a twice number of wound turns of a conductor.

Similarly, since the 14th armature coil 51-14 for phase B and 15th armature coil 51-15 for phase B' are wound commonly on the stator pole 47-6 both in the reverse winding direction to that of the first armature coil 51-1 for phase A, they are described, for convenience of description, as if they were two separate armature coils, but they may be regarded actually as a single armature coil having a twice number of wound turns of a conductor.

A magnetic member 105 in the form of a ring may be secured to faces of the stator poles 47-1 to 47-12 of the stator armature core 46 opposing to the driving magnet rotor 49 with a radial air gap 48 left therebetween for a similar object to that described above with reference to the single-phase brushless motor 12 described hereinabove with reference to FIGS. 3 to 7.

A developed view of the driving magnet rotor 49 and the stator armature core 46 of the cored single-phase brushless motor 45 is shown in FIG. 10(a), and FIG. 10(b) shows a developed view of the armature coils 51A-1, 51A-2, 51A'-1, 51A'-2, 51B-1, 51B-2, 51B'-1 and 51B'-2 for the phases A, A', B and B'. Meanwhile, FIGS. 10(c) to 10(u) are diagrams showing torque curves generated by the armature coils of the cored single-phase brushless motor 45, and in those figures, the ordinate 28 represents a torque (T) and the abscissa 28 represents an angular displacement (ω) of the magnet rotor 2 of the motor 45. Further, FIGS. 10(v) to 10(x) are diagrammatic representations indicating ranges of the angular rotor displacement in electrical angle (θ) associated with FIGS. 10(c) to 10(u).

Referring to FIGS. 10(c) to 10(u), as the armature coils 51A-1, 51A-2, 51A'-1, 51A'-2 for phases A, A' are energized, the driving magnet rotor 49 is moved in a direction indicated by an arrow mark F (FIG. 10(a)) relative to the stator armature core 46. Thus, a torque curve 52 as shown in FIG. 10(c) is obtained by the first armature coil 51-1 of the armature coil 51A-1 for phase A.

A torque curve 53 as shown in FIG. 10(d) is obtained by the second armature coil 51-2 for phase A.

A torque curve 54 as shown in FIG. 10(e) is obtained by the third armature coil 51-3 of the armature coil 51A'-1 for phase A'.

A torque curve 55 as shown in FIG. 10(f) is obtained by fourth armature coil 51-4 for phase A'.

A torque curve 56 as shown in FIG. 10(g) is obtained by the fifth armature coil 51-5 of the armature coil 51A-2 for phase A.

A torque curve 57 as shown in FIG. 10(h) is obtained by sixth armature coil 51-6 for phase A.

A torque curve 58 as shown in FIG. 10(i) is obtained by the seventh armature coil 51-7 of the armature coil 51A'-2 for phase A'.

A torque curve 59 as shown in FIG. 10(j) is obtained by eighth armature coil 51-8 for phase A'.

Thus, by combining the torques as indicated by the torque curves 52 to 59 in FIGS. 10(c) to 10(j), a composite torque curve 60 as shown in FIG. 10(k) is obtained.

Meanwhile, as the armature coils 51B-1, 51B-2, 51B'-1, 51B'-2 for phases B, B' are energized, driving magnet rotor 49 is moved in the direction indicated by the arrow mark F (FIG. 10(a)) relative to the stator armature core 46. Thus, a torque curve 61 as shown in FIG. 10(l) is obtained by the ninth armature coil 51-9 of armature coil 51B-1 for phase B.

A torque curve 62 as shown in FIG. 10(m) is obtained by the tenth armature coil 51-10 for phase B.

A torque curve 63 as shown in FIG. 10(n) is obtained by the 11th armature coil 51-11 of the armature coil 51B'-1 for phase B'.

A torque curve 64 as shown in FIG. 10(o) is obtained by 12th armature coil 51-12 for phase B'.

A torque curve 65 as shown in FIG. 10(p) is obtained by the 13th armature coil 51-13 of the armature coil 51B-2 for phase B.

A torque curve 66 as shown in FIG. 10(q) is obtained by 14th armature coil 51-14 for phase B.

A torque curve 67 as shown in FIG. 10(r) is obtained by the 15th armature coil 51-15 of the armature coil 51B'-2 for phase B'.

A torque curve 68 as shown in FIG. 10(s) is obtained by 16th armature coil 51-16 for phase B'.

Thus, by combining the torques as indicated by the torque curves 61 to 68 in FIGS. 10(l) to 10(s), a composite torque curve 69 as shown in FIG. 10(t) is obtained.

Accordingly, by combining the torque curves 60 and 69 indicated in FIGS. 10(k) and 10(t), a composite torque curve 70 as shown in FIG. 10(u) is obtained.

The composite torque curve 70 shown in FIG. 10(u) includes a solid line representation of the composite torque curve 60 of FIG. 10(k) obtained by the armature coils 51A-1, 51A-2, 51A'-1 and 51A'-2 for the phases A, A', and a broken line representation of the composite torque curve 69 of FIG. 10(t) obtained by the armature coils 51B-1, 51B-2, 51B'-1 and 51B'-2 for the phases B, B'. In order to facilitate discrimination of the curves 60, 69, the composite torque curve 70 includes the solid and broken line representations of the curves 60, 69 displaced or offset a little from each other.

As seen from FIGS. 10(u) to 10(w), a torque which is uniform over a range of an electrical angle of 360 degrees with smooth ripples can be obtained.

Thus, a smooth torque can be obtained over a range of an electrical angle of 360 degrees by the single-phase brushless motor 45 which includes only one position-detecting element. Accordingly, the single-phase brushless motor 45 can start itself and can rotate a full rotation and continue its rotation.

In particular, as apparently seen from FIGS. 10(u) to 10(w), two positive torques, that is, torques in the forward direction, are obtained over different ranges of an electrical angle of 240 degrees from the composite torque curves 60 and 69, and a positive torque is obtained over a range of an electrical angle of 360 degrees as a whole by the two torques.

Accordingly, by energizing the armature coils 51A-1, 51A-2, 51A'-1 and 51A'-2 for the phases A, A' over a range of an electrical angle of 180 degrees which is a central flat portion of the composite torque curve 60 within the range of the electrical angle of 240 degrees and which is indicated by a range 71 hatched with rightwardly upwardly inclined lines in FIG. 10(v), a positive torque can be obtained corresponding to the hatched range 71.

Further, by energizing the armature coils 51B-1, 51B-2, 51B'-1 and 51B'-2 for the phases B, B' over a range of an electrical angle of 180 degrees which is a central flat portion of the composite torque curve 69 within the range of the electrical angle of 240 degrees and which is indicated by a range 72 hatched with leftwardly upwardly inclined lines in FIG. 10(w), a positive torque can be obtained corresponding to the hatched range 72.

Accordingly, a torque in the forward direction which is flat and uniform over a range of an electrical angle of 360 degrees as seen from a hatched portion 73 of FIG. 10(x) can be obtained.

Figure 11:
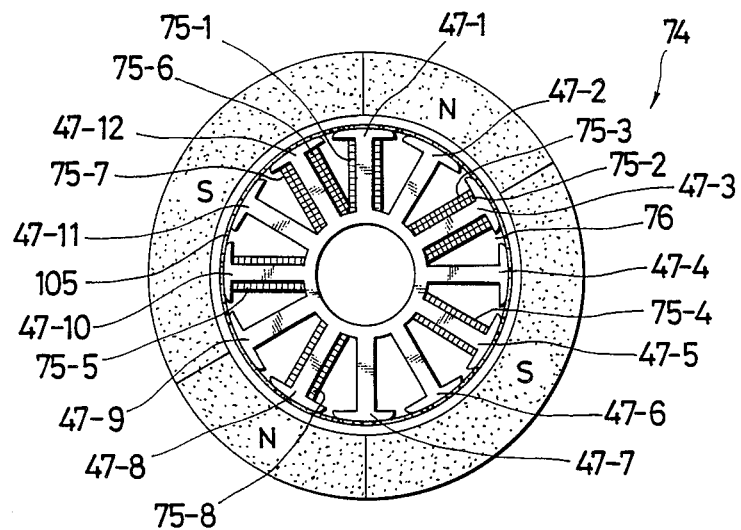
FIG. 11 is a schematic illustration of a single-phase brushless motor according to a third embodiment of the invention.

Referring now to FIG. 11, a cored single-phase brushless motor 74 according to a third embodiment of the present invention will be described.

The single-phase brushless motor 74 includes a stator armature core 76 which has a very similar construction to that of the stator armature core 46 of the single-phase brushless motor 45 described hereinabove in conjunction with FIG. 8 and is only different in number and arrangement of armature coils thereon. Thus, like parts or components are designated by like reference numerals to those of the single-phase brushless motor 45 of FIG. 8, and description will be given only of different part of the single-phase brushless motor 74 from the motor 45.

A first armature coil 75-1 for phase A is wound on a stator pole 47-1 formed at a circumferential position of an electrical angle of m·360·a degrees (since m=1 and a=1 are selected in the present embodiment, 360 degrees in electrical angle; 180 degrees in mechanical angle).

Figure 12A:
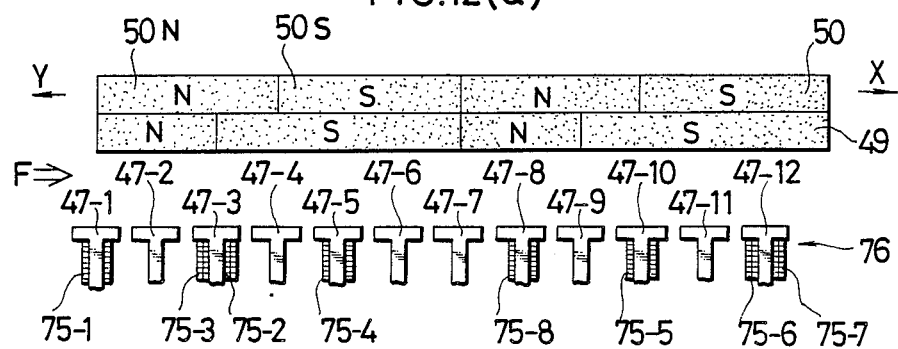
FIGS. 12(a) to 12(n) are diagrammatic representations illustrating a principle of the single-phase brushless motor of FIG. 11, FIG. 12(a) being a developed view of a driving magnet rotor and a stator armature core of the motor of FIG. 11, FIG. 12(b) being a developed view of stator coils of the stator armature core, FIGS. 12(c) to 12(m) being diagrams showing torque curves of the motor of FIG. 11, and FIG. 12(n) being a diagrammatic representation illustrating ranges of energization of the motor of FIG. 11.

A second armature coil 75-2 for the phase A is wound in a reverse direction to that of the first armature coil 75-1 for phase A on stator pole 47-3 formed at a position circumferentially spaced by an angular distance equal to an electrical angle of 120 degrees (60 degrees in mechanical angle) from the position of the stator pole 47-1 in a direction indicated by an arrow mark X in FIG. 12(a).

A third armature coil 75-3 for phase A' is wound also on stator pole 47-3 in the reverse direction to that of the first armature coil 75-1 for phase A.

A fourth armature coil 75-4 for the phase A' is wound in the same winding direction as the first armature coil 75-1 for phase A on stator pole 47-5 formed at a position circumferentially spaced by an angular distance equal to an electrical angle of n·(360·c−120) degrees (in the present embodiment, n=1 and c=1 are selected), that is, 240 degrees (120 degrees in mechanical angle), from the position of the stator pole 47-1 in the direction of the arrow mark X of FIG. 12(a).

A fifth armature coil 75-5 for phase B is wound in the reverse winding direction to that of the first armature coil 75-1 for phase A on stator pole 47-10 formed at a position circumferentially spaced by an angular distance equal to an electrical angle of n·(360·d−180) degrees (in the present embodiment, n=1 and d=1 are selected), that is, 180 degrees (90 degrees in mechanical angle), from the position of the stator pole 47-1 in a direction indicated by an arrow mark Y in FIG. 12(a).

A sixth armature coil 75-6 for phase B is wound in the reverse winding direction to that of the first armature coil 75-1 for phase A on stator pole 47-12 formed at a position circumferentially spaced by an angular distance equal to an electrical angle of n·(360·e−60) degrees (in the present embodiment, n=1 and e=1 are selected), that is, 60 degrees (30 degrees in mechanical angle), from the position of the stator pole 47-1 in the direction of the arrow mark Y in FIG. 12(a).

A seventh armature coil 75-7 for phase B' is also wound on the stator pole 47-12 in the reverse winding direction to that of the first armature coil 75-1 for phase A.

An eighth armature coil 75-8 for phase B' is wound in the same winding direction as the first armature coil 75-1 for the phase A on a stator pole 47-8 formed at a position circumferentially spaced by an angular distance equal to an electrical angle of n·(360·f−180) degrees (in the present embodiment, n=1 and f=1 are selected), that is, 180 degrees (90 degrees in mechanical angle), from the position of the stator pole 47-5 in the direction of the arrow mark X in FIG. 12(a).

The armature coils 75-1 and 75-2 constitute an armature coil 75A for phase A (refer to FIG. 12b)).

Figure 12B:
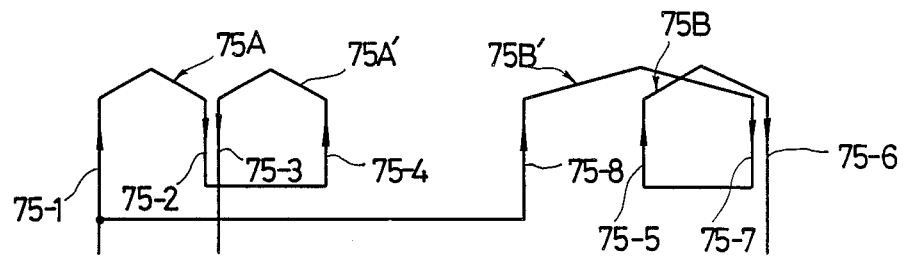

The armature coils 75-3 and 75-4 constitute an armature coil 75A' for phase A' (refer to FIG. 12(b)).

The armature coils 75-5 and 75-6 constitute an armature coil 75B for phase B (refer to FIG. 12(b)).

The armature coils 75-7 and 75-8 constitute an armature coil 75B' for the phase B' (refer to FIG. 12(b)).

It is to be noted that since the second armature coil 75-2 for phase A and third armature coil 75-3 for the phase A' are wound commonly on the stator pole 47-3 both in the reverse winding direction to that of the first armature coil 75-1 for the phase A, they are described, for convenience of description, as if they were two separate armature coils, but they may be regarded actually as a single armature coil having a twice number of wound turns of a conductor.

It is also to be noted that since the sixth armature coil 75-6 for phase B and seventh armature coil 75-7 for phase B' are wound commonly on the stator pole 47-12 both in the reverse winding direction to that of the first armature coil 75-1 for phase A, they are described, for convenience of description, as if they were two separate armature coils, but they may be regarded actually as a single armature coil having a twice number of wound turns of a conductor.

A magnetic member 105 in the form of a ring may be secured to faces of the stator poles 47-1 to 47-12 of the stator armature core 76 opposing to the driving magnet rotor 49 with a radial air gap left therebetween for a similar object to that described above with reference to the single-phase brushless motors 12 and 45 described hereinabove with reference to FIGS. 3 to 7 and FIGS. 8 to 10(x), respectively.

A developed view of the driving magnet rotor 49 and the stator armature core 76 of the cored single-phase brushless motor 74 is shown in FIG. 12(a), and FIG. 12(b) shows a developed view of the armature coils 75A, 75A', 75B, 75B' for the phases A, A', B and B'. Meanwhile, FIGS. 12(c) to 12(m) are diagrams showing torque curves generated by the armature coils of the cored single-phase brushless motor 42, and in those figures, the ordinate 28 represents a torque (T) and the abscissa 29 represents an angular displacement (ω) of the magnet rotor of the motor 74. Further, FIG. 12(n) is a diagrammatic representation indicating ranges of the angular rotor displacement in electrical angle (θ) associated with FIGS. 12(c) to 12(m).

Referring to FIGS. 12(c) to 12(m), as the armature coils 75A, 75A' for phases A, A' are energized, the driving magnet rotor 49 is moved in a direction indicated by an arrow mark F (FIG. 12(a)) relative to the stator armature core 76. Thus, a torque curve 77 as shown in FIG. 12(c) is obtained by the first armature coil 75-1 of armature coil 75A for phase A.

A torque curve 78 as shown in FIG. 12(d) is obtained by second armature coil 75-2 for phase A.

A torque curve 79 as shown in FIG. 12(e) is obtained by the third armature coil 75-3 of the armature coil 75A' for the phase A'.

A torque curve 80 as shown in FIG. 12(f) is obtained by fourth armature coil 75-4 for phase A'.

Thus, by combining the torques as indicated by the torque curves 77 to 80 in FIGS. 12(c) to 12(f), a composite torque curve 81 as shown in FIG. 12(g) is obtained.

Meanwhile, as the armature coils 75B, 75B' for the phases B, B' are energized, the driving magnet rotor 49 is moved in the direction indicated by the arrow mark F (FIG. 12(a)) relative to the stator armature core 76. Thus, a torque curve 82 as shown in FIG. 12(h) is obtained by the fifth armature coil 75-5 of the armature coil 75B for phase B.

A torque curve 83 as shown in FIG. 12(i) is obtained by sixth armature coil 75-6 for phase B.

A torque curve 84 as shown in FIG. 12(j) is obtained by the seventh armature coil 75-7 of the armature coil 75B' for phase B'.

A torque curve 85 as shown in FIG. 12(k) is obtained by eighth armature coil 75-8 for phase B'.

Thus, by combining the torques as indicated by the torque curves 82 to 85 in FIGS. 12(h) to 12(k), a composite torque curve 86 as shown in FIG. 12(l) is obtained.

Accordingly, by combining the torque curves 81 and 86 indicated in FIGS. 12(g) to 12(l), a composite torque curve 87 as shown in FIG. 12(m) is obtained.

The composite torque curve 87 shown in FIG. 12(m) includes a solid line representation of the composite torque curve 81 of FIG. 12(g) obtained by the armature coils 75A, 75A' for phases A, A', and a broken line representation of the composite torque curve 86 of FIG. 12(l) obtained by the armature coils 75B, 75B' for the phases B, B'. In order to facilitate discrimination of the curves 81, 86, the composite torque curve 87 includes the solid and broken line representations of the curves 81, 86 displaced or offset a little from each other.

As apparently seen from FIGS. 12(m) and 12(n), a torque which is uniform over a range of an electrical angle of 360 degrees with smooth ripples can be obtained.

Thus, a smooth torque can be obtained over a range of an electrical angle of 360 degrees by the single-phase brushless motor 74 which includes only one position detecting element. Accordingly, the single-phase brushless motor 74 can start itself and can rotate a full rotation and continue its rotation. In particular, as apparently seen from FIGS. 12(m) and 12(n), two positive torques, that is, torques in the forward direction, are obtained over different ranges of an electrical angle of 240 degrees from the composite torque curves 81 and 86, and a positive torque is obtained over a range of an electrical angle of 360 degrees as a whole by the two torques.

Figure 13:
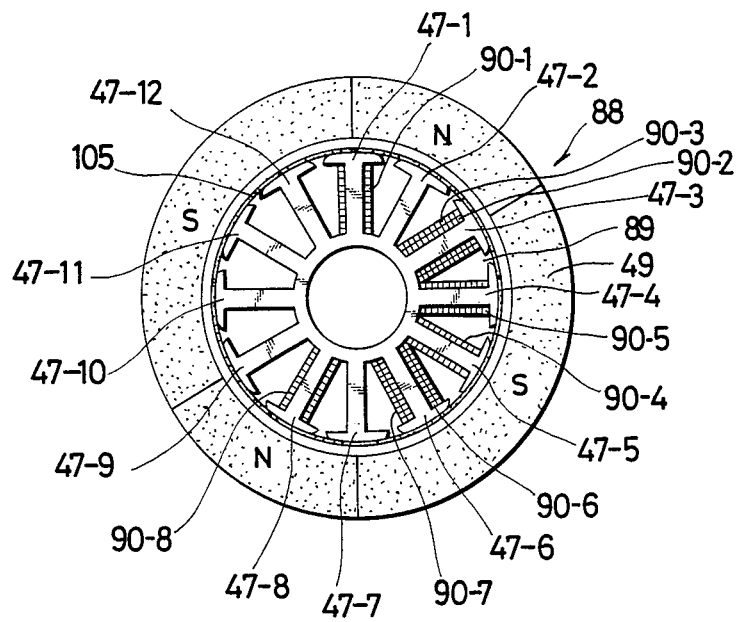
FIG. 13 is a schematic illustration of a single-phase brushless motor according to a fourth embodiment of the invention.

Referring now to FIG. 13, a cored single-phase brushless motor 88 according to a third embodiment of the present invention will be described.

The single-phase brushless motor 88 includes a stator armature core 89 which has a very similar construction to that of the stator armature core 46 of the single-phase brushless motor 45 described hereinabove in conjunction with FIG. 8 and is only different in number and arrangement of armature coils thereon. Thus, like parts or components are designated by like reference numerals to those of the single-phase brushless motor 45 of FIG. 8, and description will be given only of different part of the single-phase brushless motor 88 from the motor 45.

A first armature coil 90-1 phase A is wound on a stator pole 47-1 formed at a circumferential position of an electrical angle of m·360·a degrees (since m=1 and a=1 are selected in the present embodiment, 360 degrees in electrical angle; 180 degrees in mechanical angle).

Figure 14A:
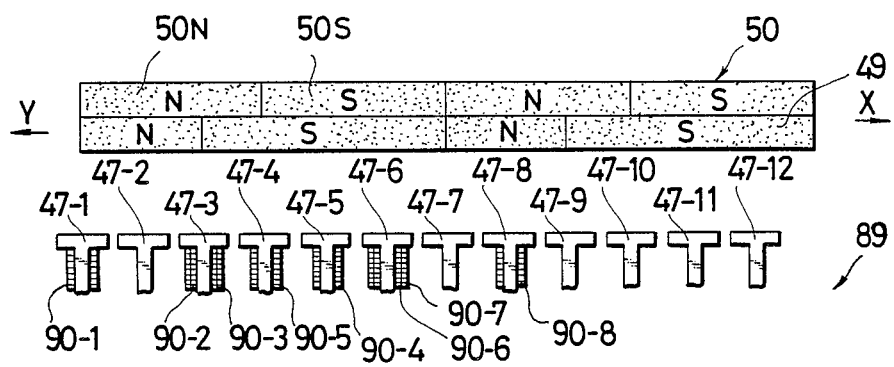
FIGS. 14(a) to 14(n) are diagrammatic representations illustrating a principle of the single-phase brushless motor of FIG. 13, FIG. 14(a) being a developed view of a driving magnet rotor and a stator armature core of the motor of FIG. 13, FIG. 14(b) being a developed view of stator coils of the stator armature core, FIGS. 14(c) to 14(m) being diagrams showing torque curves of the motor of FIG. 13, and FIG. 14(n) being a diagrammatic representation illustrating ranges of energization of the motor of FIG. 13.

A second armature coil 90-2 for phase A is wound in a reverse direction to that of the first armature coil 90-1 for the phase A on a stator pole 47-3 formed at a position circumferentially spaced by an angular distance equal to an electrical angle of 120 degrees (60 degrees in mechanical angle) from the position of the stator pole 47-1 in a direction indicated by an arrow mark X in FIG. 14(a).

A third armature coil 90-3 for phase A' is wound also on the stator pole 47-3 in the reverse direction to that of the first armature coil 90-1 for phase A.

A fourth armature coil 90-4 for phase A' is wound in the same winding direction as the first armature coil 90-1 for phase A on stator pole 47-5 formed at a position circumferentially spaced by an angular distance equal to an electrical angle of n·(360·c−120) degrees (in the present embodiment, n=1 and c=1 are selected), that is, 240 degrees (120 degrees in mechanical angle), from the position of the stator pole 47-1 in the direction of the arrow mark X of FIG. 14(a).

A fifth armature coil 90-5 for phase B is wound in the reverse winding direction to that of the first armature coil 90-1 for phase A on stator pole 47-4 formed at a position circumferentially spaced by an angular distance equal to an electrical angle of n·(360·d-180) degrees (in the present embodiment, n=1 and d=1 are selected), that is, 180 degrees (90 degrees in mechanical angle), from the position of the stator pole 47-1 in the direction of the arrow mark X in FIG. 14(a).

A sixth armature coil 90-6 for phase B is wound in the opposite winding direction to that of the first armature coil 90-1 for phase A on stator pole 47-6 formed at a position circumferentially spaced by an angular distance equal to an electrical angle of n·(360·e-60) degrees (in the present embodiment, n=1 and e=1 are selected), that is, 300 degrees (150 degrees in mechanical angle), from the position of the stator pole 47-1 in the direction of the arrow mark X in FIG. 14(a).

A seventh armature coil 90-7 for phase B' is also wound on the stator pole 47-6 in the reverse winding direction to that of the first armature coil 90-1 for phase A.

An eighth armature coil 90-8 for the phase B' is wound in the same winding direction as the first armature coil 90-1 for the phase A on a stator pole 47-8 formed at a position circumferentially spaced by an angular distance equal to an electrical angle of n·(360·f−180) degrees (in the present embodiment, n=1 and f=1 are selected), that is, 180 degrees (90 degrees in mechanical angle), from the position of the stator pole 47-5 in the direction of the arrow mark X in FIG. 12(a).

Figure 14B:
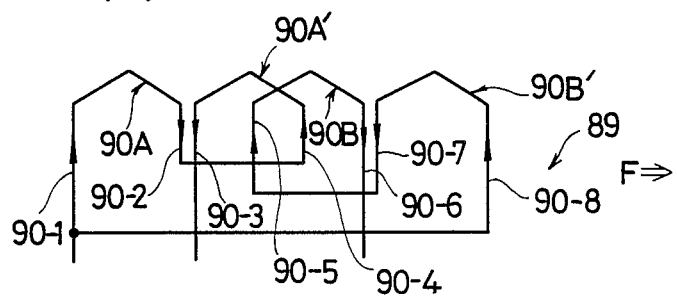

The armature coils 90-1 and 90-2 constitute an armature coil 90A for phase A (FIG. 14(b)).

The armature coils 90-3 and 90-4 constitute an armature coil 90A' for phase A' (FIG. 14(b)).

The armature coils 90-5 and 90-6 constitute an armature coil 90B for phase B (FIG. 14(b)).

The armature coils 90-7 and 90-8 constitute an armature coil 90B' for phase B' (FIG. 14(b)).

It is to be noted that since the second armature coil 90-2 for phase A and third armature coil 90-3 for phase A' are wound commonly on the stator pole 47-3 both in the reverse winding direction to that of first armature coil 90-1 for phase A, they are described, for convenience of description, as if they were two separate armature coils, but they may be regarded actually as a single armature coil having a twice number of wound turns of a conductor.

It is also to be noted that since the sixth armature coil 90-6 for phase B and seventh armature coil 90-7 for phase B' are wound commonly on the stator pole 47-6 both in the reverse winding direction to that of the first armature coil 90-1 for phase A, they are described, as if they were two separate armature coils, for convenience of description, but they may be regarded actually as a single armature coil having a twice number of wound turns of a conductor.

A magnetic member 105 in the form of a ring may be secured to faces of the stator poles 47-1 to 47-12 of the stator armature core 89 opposing to the driving magnet rotor 49 with a radial air gap left therebetween for a similar object to that described above with reference to the single-phase brushless motors 12, 45 and 74 described hereinabove with reference to FIGS. 3 to 7, FIGS. 8 to 10(x) and FIGS. 11 to 12(n), respectively.

A developed view of the driving magnet rotor 49 and the stator armature core 89 of the cored single-phase brushless motor 88 is shown in FIG. 14(a), and FIG. 14(b) shows a developed view of the armature coils 90A, 90A', 90B, 90B' for phases A, A', B and B'. Meanwhile, FIGS. 14(c) to 14(m) are diagrams showing torque curves generated by the armature coils of the cored single-phase brushless motor 88, and in those figures, the ordinate 28 represents a torque (T) and the abscissa 29 represents an angular displacement (ω) of the magnet rotor of the motor 88. Further, FIG. 14(n) is a diagrammatic representation indicating ranges of the angular rotor displacement in electrical angle (θ) associated with FIGS. 14(c) to 14(m).

Referring to FIGS. 14(c) to 14(m), as the armature coils 90A, 90A' for phases A, A' are energized, the driving magnet rotor 49 is moved in a direction indicated by an arrow mark F (FIG. 14(a)) relative to the stator armature core 89. Thus, a torque curve 91 as shown in FIG. 14(c) is obtained by the first armature coil 90-1 of armature coil 90A for phase A.

A torque curve 92 as shown in FIG. 14(d) is obtained by second armature coil 90-2 for phase A.

A torque curve 93 as shown in FIG. 14(e) is obtained by the third armature coil 90-3 of the armature coil 90A' for phase A'.

A torque curve 94 as shown in FIG. 14(f) is obtained by fourth armature coil 90-4 for phase A'.

Thus, by combining the torques as indicated by the torque curves 91 to 94 in FIGS. 14(c) to 14(f), a composite torque curve 95 as shown in FIG. 14(g) is obtained.

Meanwhile, as the armature coils 90B, 90B' for the phases B, B' are energized, the driving magnet rotor 49 is moved in the direction indicated by the arrow mark F (FIG. 4(a)) relative to the stator armature core 89. Thus, a torque curve 96 as shown in FIG. 14(h) is obtained by the fifth armature coil 90-5 of the armature coil 90B for phase B.

A torque curve 97 as shown in FIG. 14(i) is obtained by sixth armature coil 90-6 for phase B.

A torque curve 98 as shown in FIG. 14(j) is obtained by the seventh armature coil 90-7 of the armature coil 90B' for phase B'.

A torque curve 99 as shown in FIG. 14(k) is obtained by eighth armature coil 90-8 for phase B'.

Thus, by combining the torque as indicated by the torque curves 96 to 99 in FIGS. 14(h) to 14(k), a composite torque curve 100 as shown in FIG. 14(l) is obtained.

Accordingly, by combining the torque curves 95 and 100 indicated in FIGS. 14(g) and 14(l), a composite torque curve 101 as shown in FIG. 14(m) is obtained.

The composite torque curve 101 shown in FIG. 14(m) includes a solid line representation of the composite torque curve 95 of FIG. 14(g) obtained by the armature coils 90A, 90A' for phases A, A', and a broken line representation of the composite torque curve 100 of FIG. 14(l) obtained by the armature coils 90B, 90B' for phases B, B'. In order to facilitate discrimination of the curves 95, 100, the composite torque curve 101 includes the solid and broken line representations of the curves 95, 100 displaced or offset a little from each other.

As apparently seen from FIGS. 14(m) and 14(n) a torque which is uniform over a range of an electrical angle of 360 degrees with smooth ripples can be obtained.

Thus, a smooth torque can be obtained over a range of an electrical angel of 360 degrees by the single-phase brushless motor 88 which includes only one position-detecting element. Accordingly, the single-phase brushless motor 88 can start itself and can rotate a full rotation and continue its rotation.

In particular, as apparently seen from FIGS. 14(m) and 14(n), two positive torques, that is, torques in the forward direction, are obtained over different ranges of an electrical angle of 240 degrees from the composite torque curves 95 and 100, and a positive torque is obtained over a range of an electrical angle of 360 degrees as a whole by the two torques.

Figure 4:
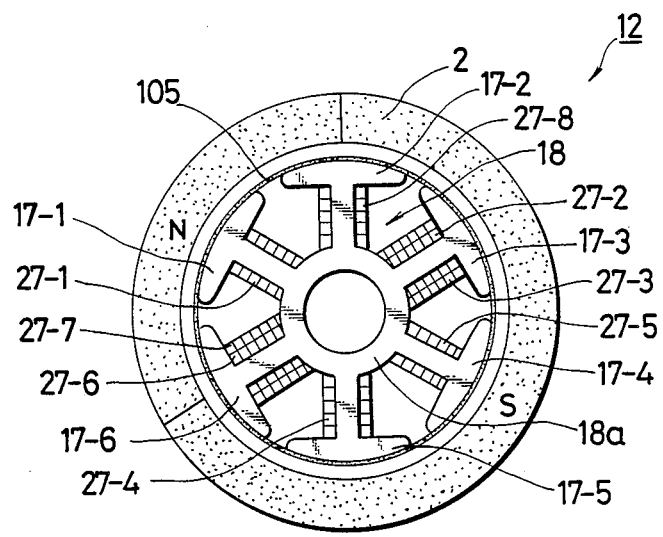
FIG. 4 is a schematic illustration of the motor of FIG. 3.
Figure 15:
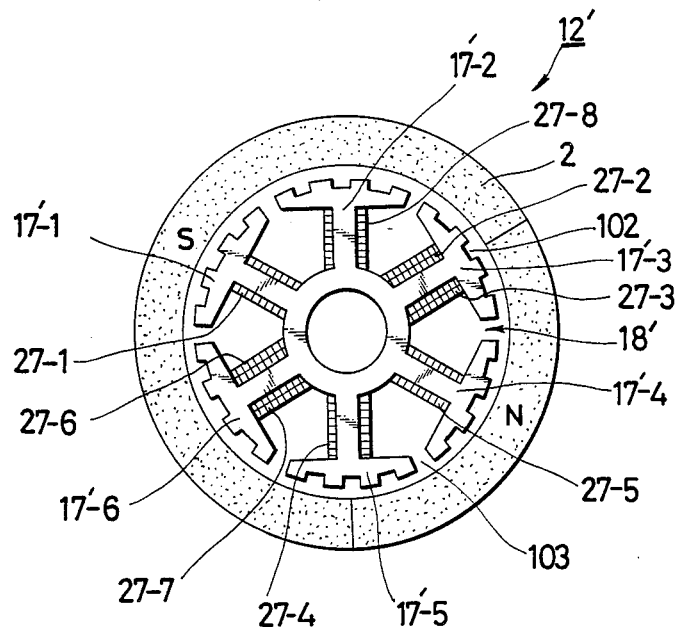
FIGS. 15 to 18 are schematic illustrations of single-phase brushless motors according to different embodiments of the invention.

Referring now to FIG. 15, there is shown a single-phase brushless motor 12' having a stator armature core 18' which is an improvement over the stator armature core 18 of the single-phase brushless motor 12 of FIG. 4 in that torque ripples are smoothed further. Since the single-phase brushless motor 12' is only different in structure of the stator armature core 18' thereof from the single-brushless motor 12, description will be given only of the stator armature core 18'.

Similarly to the stator armature core 18, the stator armature core 18' has 6 stator poles 17'-1 to 17'-6 thereon. However, the stator poles 17'-1 to 17'-6 are different and characterized in that they each have n (n is an integer equal to or greater than 1) auxiliary grooves formed on a face thereof opposing to a magnet rotor 2. In the embodiment shown, each of the stator poles 17'-1 to 17'-6 has 3 auxiliary grooves 102 formed in a circumferentially equidistantly spaced relationship on a face thereof.

The auxiliary grooves 102 preferably have an an angular or circumferential width substantially equal to the angular or circumferential width of air gaps between the individual stator poles 17'-1 to 17'-6. Besides, the auxiliary grooves 102 and the air gaps 103 are preferably formed in a circumferentially equidistantly spaced relationship.

In the case of the stator armature core 14 of FIG. 4 which has no such auxiliary grooves 102 formed thereon, magnetic fluxes of the magnet rotor 2 will scarcely pass through slots between the stator poles and almost all of such magnetic fluxed will be absorbed by the stator poles, and hence a cogging will appear at each distance between such air gaps 103 between the stator poles. Therefore, the auxiliary grooves 102 having such a specific construction as described above are provided so that a cogging may appear at each small distance in order to allow smooth rotation of the single-phase brushless motor 12'.

Figure 16:
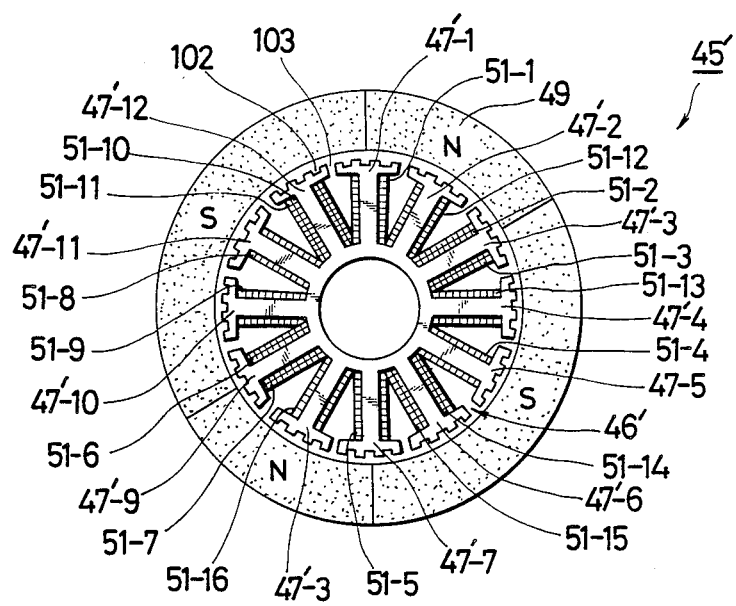

Referring now to FIG. 16, there is shown a single-phase brushless motor 45' including a stator armature core 46' which is an improvement over the stator armature core 46 of the single-phase brushless motor 45 of FIG. 8. In the single-phase brushless motor 45', auxiliary grooves 102 are formed on stator poles 47'-1 to 47'-12 of the stator armature core 46' in a similar condition as in the stator armature core 18'. The stator poles 47'-1 to 47'-12 correspond to the stator poles 47-1 to 47-12, respectively.

Figure 17:
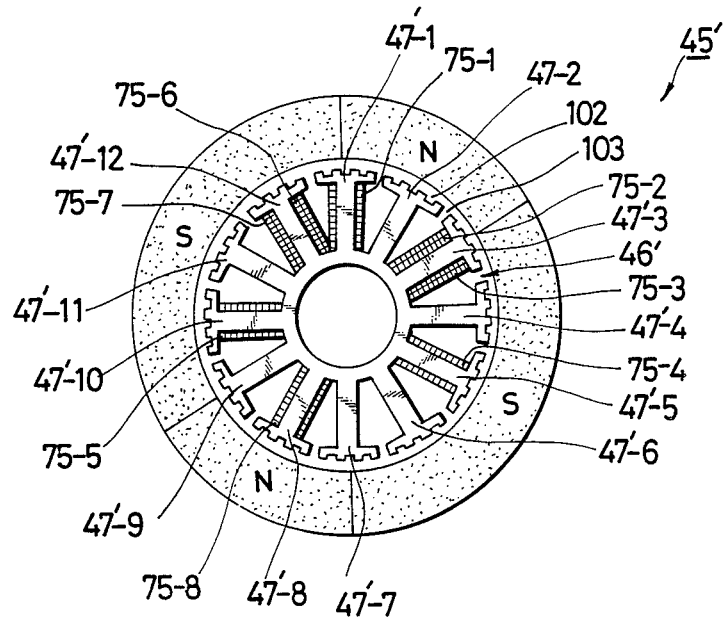
Figure 18:
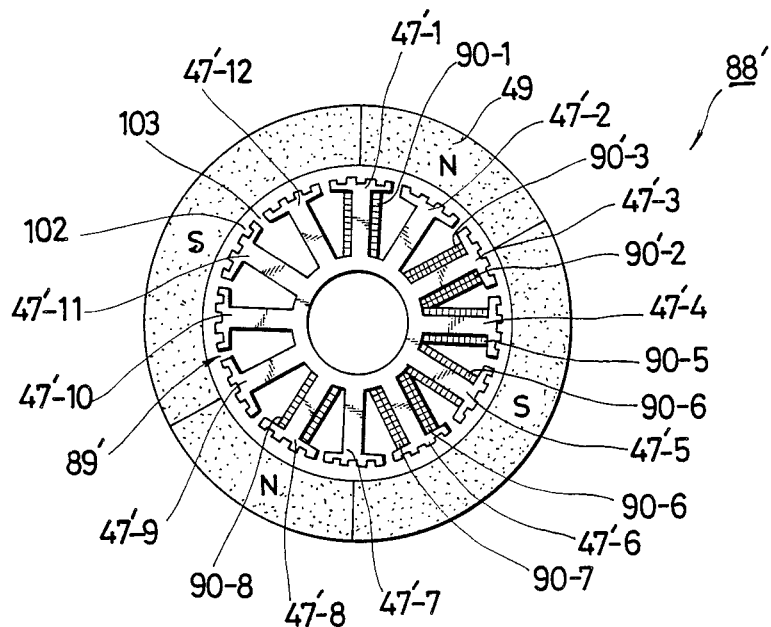

Referring now to FIG. 17, there is shown a single-phase brushless motor 74' including a stator armature core 76' which is an improvement over the stator armature core 76 of the single-phase brushless motor 74 of FIG. 11. In the single-phase brushless motor 74', auxiliary grooves 102 are formed on stator poles 47'-1 to 47'-12 of the stator armature core 46' in a similar condition as in the stator armature core 18'. The stator poles 47'-1 to 47'-12 correspond to the stator poles 47-1 to 47-12 of FIG. 11, respectively. Referring now to FIG. 18, there is shown a single-phase brushless motor 88' including a stator armature core 89' which is an improvement over the stator armature core 89 of the single-phase brushless motor 88 of FIG. 13. In the single-phase brushless motor 88', auxiliary grooves 102 are formed on stator poles 47'-1 to 47'-12 of the stator armature core 89° in a similar condition as in the stator armature core 18'. The stator poles 47'-1 to 47'-12 correspond to the stator poles 47-1 to 47-12 of FIG. 13, respectively.

It is to be noted that while all of the single-phase brushless motors according to the preferred embodiments described hereinabove and shown in the accompanying drawing are of the outer rotor type, the present invention can naturally be applied to single-phase brushless motors of the inner rotor type.

It is also to be noted that while all of the single-phase brushless motors described hereinabove employ a 2- or 4-pole driving magnet rotor, a single-phase brushless motor according to the present invention can employ a generally 2P-pole (P is an integer equal to or greater than 1) magnet rotor.

By the way, while the driving magnet rotors described hereinabove are each formed as a single block on which magnetic poles are formed, they may otherwise be formed as a member including a plurality of magnetic pole segments each providing a magnetic pole as shown in a developed view of FIG. 19 or 20.

Figure 19:
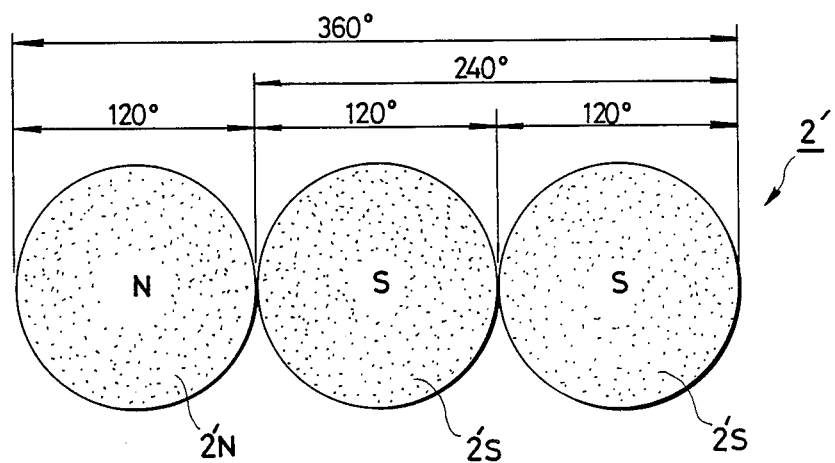
FIGS. 19 and 20 are schematic illustrations of driving magnet rotors in modified forms.

A magnet rotor 2' shown in FIG. 19 corresponds to the magnet rotor 2 of FIG. 2 and includes a single N magnetic poles segment 2'N and 2S magnetic pole segments 2'S.

Figure 20:
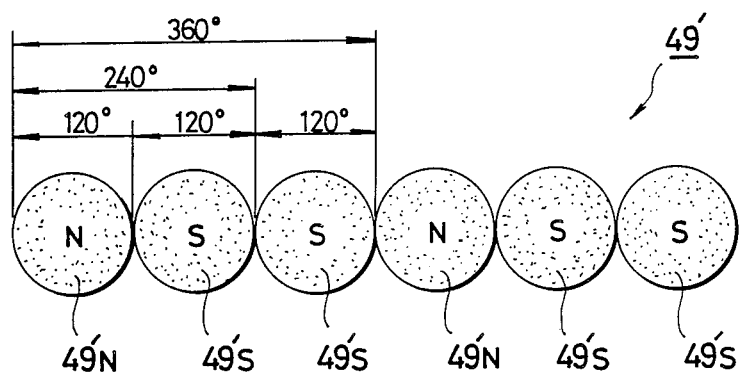

Meanwhile, a magnet rotor 49' shown in FIG. 20 corresponds to the magnet rotor 49 of FIG. 8 and includes 2N magnetic pole segments 49'N and 4S magnetic pole segments 49'S.

It is to be noted that while position-detecting magnet rotor 19 and 50 are described as formed at lower end faced of the driving magnet rotors 2 and 49, respectively, they may be formed at any other location of the driving magnet rotors 2 and 49.

Further, while the position-detecting magnet rotors 19 and 50 are provided specifically, the driving magnet rotors 2 and 49 may also serve as such with the position-detecting magnet rotors 19 and 50 omitted.

In such a case, a suitable means may be adopted for detecting the position of the driving magnet rotor: for example, a bias is provided at a switching point of the position detecting element 26 in order to switch energization of stator coils for each electrical angle of 180 degrees; or an additional position-detecting element is provided so that energization of stator coils may be switched making use of a difference in output voltage between the two position-detecting elements; or else a separate position-detecting magnet rotor is provided for integral rotation with a rotary shaft so that it may be detected by the position-detecting element.

Having now fully described the invention, it will be apparent to one of ordinary skill in the art that many changes and modifications can be made thereto without departing from the spirit and scope of the invention as set forth herein.

What is claimed is:

1. A single-phase brushless motor, comprising a field magnet as a rotor having 2P, P being an integer equal to or greater than 1, alternate north and south magnetic pole zones, each of the north and south magnetic pole zones of said field magnet having an angular width equal to an electrical angle of about 120 degrees while each of the other magnetic pole zones has an angular width equal to an electrical angle of about 240 degrees, a stator armature core having a plurality of stator poles formed thereon in an opposing relationship to said field magnet with an air gap left therebetween, a plurality of armature coils wound on said stator poles of said stator armature core and including first n, n being an integer equal to or greater than 1, armature coil or coils for the phase A wound on one or ones of said stator poles formed at a position or positions of an electrical angle of about m·(360·a) degrees, m being an integer equal to or greater than 0, and a being an integer equal to or greater than 1, second n armature coil or coils for the phase A wound in a reverse direction to that of said first armature coil or coils for the phase A on one or ones of said stator poles formed at a position or positions circumferentially spaced by an angular distance equal to an electrical angle of about n·(360·b − 240) degrees, b being an integer equal to or greater than 1, from the stator pole or poles on which said first armature coil or coils for the phase A are wound, third n armature coil or coils for the phase A' wound in the reverse direction to that of said first armature coil or coils for the phase A on one or ones of said stator poles formed at a position or positions circumferentially spaced by an angular distance equal to an electrical angle of about n·(360·b−240) degrees from the stator pole or poles on which said first armature coil or coils are wound, fourth n armature coil or coils for the phase A' wound in the same winding direction as said first armature coil or coils for the phase A on one or ones of said stator poles formed at a position or positions circumferentially spaced by an angular distance equal to an electrical angle of about n·(360·c−120) degrees, c being an integer equal to or greater than 1, from the stator pole or poles on which said first armature coil or coils for the phase A are wound, fifth n armature coil or coils for the phase B wound in the same winding direction as said first armature coil or coils for the phase A on one or ones of said stator poles formed at a position or positions circumferentially spaced by an angular distance equal to an electrical angle of about n·(360·d−180) degrees, d being an integer equal to or greater than 1, from the stator pole or poles on which said first armature coil or coils for the phase A are wound, sixth n armature coil or coils for the phase B wound in the reverse direction to that of first armature coil or coils for the phase A on one or ones of said stator poles formed at a position or positions circumferentially spaced by an angular distance equal to an electrical angle of about n·(360·e−60) degrees, e being an integer equal to or greater than 1, from the stator pole or poles on which said first armature coil or coils for the phase A are wound, seventh n armature coil or coils for the phase B' wound in the reverse direction to that of said first armature coil or coils for the phase A on one or ones of said stator poles formed at a position or positions circumferentially spaced by an angular distance equal to an electrical angle of about n·(360·f−180) degrees, f being an integer equal to or greater than 1, from the stator pole or poles on which said third armature coil or coils for the phase A' are wound, and eighth n armature coil or coils for the phase B' wound in the same winding direction as said first armature coil or coils for the phase A on one or ones of said stator poles formed at a position or positions circumferentially spaced by an angular distance equal to an electrical angle of about n·(360·g−180) degrees, g being an integer equal to or greater than 1, from the stator pole or poles on which said third armature coil or coils for the phase A' are wound, and an electric circuit for detecting the position of said field magnet to energize the armature coils for the phases A and A' and the armature coils for the phases B and B' alternately at an electric angle of about 180 degrees.

2. A single-phase brushless motor according to claim 1, wherein said stator poles of said stator armature core on which said armature coils are wound are formed in a circumferentially equidistantly spaced relationship from each other.

3. A single-phase brushless motor according to claim 1, wherein said stator poles of said stator armature core on which said armature coils are wound are formed in a circumferentially equidistantly spaced relationship from each other by an angular distance equal to an electrical angle of about 60 degrees.

4. A single-phase brushless motor according to claim 1, wherein each of said stator poles of said stator armature core has one or more auxiliary grooves formed in an equidistantly spaced relationship thereon, said auxiliary grooves of said stator poles having a substantially same angular width as the angular width of air gaps defined between said stator poles, said auxiliary grooves and said air gaps between said stator poles being spaced by a same angular distance from each other.

5. A single-phase brushless motor according to claim 1, wherein said stator armature core on which said armature coils for the phases A, A', B and B' are wound has one or more auxiliary stator poles formed between selective adjacent ones of said stator poles on which said armature coils are wound.

6. A single-phase brushless motor according to claim 5, wherein said stator poles on which said stator coils are wound and said one or more auxiliary stator pole or poles are formed in a circumferentially equidistantly spaced relationship from each other.

7. A single-phase brushless motor according to claim 6, wherein said stator poles on which said stator coils are wound and said one or more auxiliary stator pole or poles are formed generally in a circumferentially equidistantly spaced relationship from each other by an angular distance corresponding to an electrical angle of about 60 degrees.

8. A single-phase brushless motor according to claim 5, wherein each of said stator poles on which said stator coils are wound and said one or more auxiliary stator pole or poles has one or more auxiliary grooves formed in an equidistantly spaced relationship thereon, said auxiliary grooves of said stator poles and said auxiliary stator poles having a same or substantially same angular width as the angular width of an air gap defined between each adjacent ones of said stator poles and said auxiliary stator poles, said auxiliary grooves and said air gaps between said stator poles being spaced by a same angular distance from each other.

9. A single-phase brushless motor according to claim 1, wherein said field magnet as a rotor has 2 north and south magnetic pole zones, one of the north and south magnetic pole zones of said field magnet having an angular width equal to an electrical angle of about 120 degrees while the other magnetic pole zone has an angular width equal to an electrical angle of about 240 degrees, and said stator armature core has 6 stator poles formed thereon in a circumferentially equidistantly spaced relationship from each other and in an opposing relationship to said field magnet with a radial air gap left therebetween, said armature coils including a first armature coil for the phase A wound on one of said stator poles formed at a position of an electrical angle of 360 degrees, a second armature coil for the phase A wound in the reverse direction to that of said first armature coil for the phase A on one of said stator poles formed at a position circumferentially spaced by an angular distance equal to an electrical angle of about 120 degrees from the stator pole on which said first armature coil for the phase A is wound, a third armature coil for the phase A' wound in the reverse direction to that of said first armature coil on the stator pole on which said second armature coil for the phase A is wound, a fourth armature coil for the phase A' wound in the same winding direction as said first armature coil for the phase A on one of said stator poles formed at a position circumferentially spaced by an angular distance equal to an electrical angle of about 240 degrees from the stator pole on which said first armature coil for the phase A is wound, a fifth armature coil for the phase B wound in the same winding direction as said first armature coil on one of said stator poles formed at a position circumferentially spaced by an angular distance equal to an electrical angle of about 180 degrees from the stator pole on which said first armature coil for the phase A is wound, a sixth armature coil for the phase B wound in the reverse direction to that of said first armature coil for the phase A on one of said stator poles formed at a position circumferentially spaced by an angular distance equal to an electrical angle of about 60 degrees from the stator pole on which said first armature coil for the phase A is wound, a seventh armature coil for the phase B' wound in the reverse direction to that of said fourth armature coil on the stator pole on which said sixth armature coil is wound, and an eighth armature coil for the phase B' wound in the same winding direction as said first armature coil on one of said stator poles formed at a position circumferentially spaced by an angular distance equal to an electrical angle of about 60 degrees from the stator pole on which said third armature coil is wound, said electric circuit being operable to detect the position of said field magnet to energize the armature coils for the phases A and A' and the armature coils for the phases B and B' alternately at an electric angle of about 180 degrees.

10. A single-phase brushless motor according to claim 1, wherein said field magnet as a rotor has 4 alternate north and south magnetic pole zones, each of either the north or the south magnetic pole zones of said field magnet having an angular width equal to an electrical angle of about 120 degrees while each of the other magnetic pole zones has an angular width equal to an electrical angle of about 240 degrees, and said stator armature core has a plurality of stator poles formed thereon in an opposing relationship to said field magnet with an air gap left therebetween, said armature coils including a first armature coil for the phase A wound on one of said stator poles formed at a position of an electrical angle of about $m \cdot 360$ degrees, where $m=0$, a second armature coil for the phase A wound in the reverse direction to that of said first armature coil for the phase A on one of said stator poles formed at a position circumferentially spaced by an angular distance equal to an electrical angle of about 120 degrees from the stator pole on which said first armature coil for the phase A is wound, a third armature coil for the phase A' wound in the reverse direction to that of said first armature coil for the phase A on the stator pole on which said second armature coil for the phase A is wound, a fourth armature coil for the phase A' wound in the same winding direction as said first armature coil for the phase A on one of said stator poles formed at a position circumferentially spaced by an angular distance equal to an electrical angle of about $n \cdot (360 \cdot c - 120)$ degrees, where $n=1$ and $c=1$, from the stator pole on which said first armature coil for the phase A is wound, a fifth armature coil for the phase A wound in the same winding direction as said first armature coil for the phase A on one of said stator poles formed at a position circumferentially spaced by an angular distance equal to an electrical angle of about $m \cdot 360 \cdot a$ degrees, where $m=1$ and $a=1$, from the stator pole on which said first armature coil for the phase A is wound, a sixth armature coil for the phase A wound in the reverse direction to that of said first armature coil on one of said stator poles formed at a position circumferentially spaced by an angular distance equal to an electrical angle of about $n \cdot (360 \cdot b - 240)$ degrees, where $n=4$, $b=1$, from the stator pole on which said first armature coil for the phase A is wound, a seventh armature coil for the phase A' wound in the reverse direction to that of said first armature coil on the stator pole on which said sixth armature coil is wound, an eighth armature coil for the phase A' wound in the same winding direction as said first armature coil for the phase A on one of said stator poles formed at a position circumferentially spaced by an angular distance equal to an electrical angle of about $n \cdot (360 \cdot b - 240)$ degrees, where $n=5$, $b=1$, from the stator pole on which said first armature coil for the phase A is wound, a ninth armature coil for the phase B wound in the same direction as said first armature coil for the phase A on one of said stator poles formed at a position circumferentially spaced by an angular distance equal to an electrical angle of about $n \cdot (360 \cdot d - 180)$ degrees, where $N=1$, $d=1$, from the stator pole on which said first armature coil for the phase A is wound, a tenth armature coil for the phase B wound in the reverse direction to that of said first armature coil for the phase A on one of said stator poles formed at a position circumferentially spaced by an angular distance equal to an electrical angle of about $n \cdot (360 \cdot e - 180)$ degrees, where $n=3$, $e=1$, from the stator pole on which said first armature coil for the phase A is wound, an 11th armature coil for the phase B' wound in the reverse direction to that of said first armature coil of the phase A on that stator pole on which said tenth armature coil for the phase B is wound, a 12th armature coil for the phase B' wound in the same winding direction as said first armature coil for the phase A on one of said stator poles formed at a position circumferentially spaced by an angular distance equal to an electrical angle of about $n \cdot (360 \cdot g - 240)$ degrees, where $n=1$ and $g=1$, from the stator pole on which said 11th armature coil for the phase B' is wound, a 13th armature coil for the phase B wound in the same direction as said first armature coil for the phase A on one of said stator poles formed at a position circumferentially spaced by an angular distance equal to an electrical angle of about $n \cdot (360 \cdot d - 180)$ degrees, where $n=1$ and $d=1$, from the stator pole on which said first armature coil for the phase A is wound, a 14th armature coil for the phase B wound in the reverse direction to that of said first armature coil for the phase A on one of said stator poles formed at a position circumferentially spaced by an angular distance equal to an electrical angle of about $m \cdot 360 \cdot a$ degrees, where $m=1$ and $a=1$, from the stator pole on which said 11th armature coil for the phase B is wound, a 15th armature coil for the phase B' wound in the reverse direction to that of said first armature coil for the phase A on the stator pole on which said 14th armature coil for the phase B is wound, and a 16th armature coil for the phase B' wound in the same winding direction as said first armature coil for the phase A on one of said stator poles formed at a position circumferentially spaced by an angular distance equal to an electrical angle of about $n \cdot (360 \cdot g - 180)$ degrees, where $n=1$ and $g=1$, from the stator pole on which said fourth armature coil for the phase A is wound, said electric circuit being operable to detect the position of said field magnet to energize the armature coils for the phases A and A' and the armature coils for the phases B and B' alternatively at an electric angle of about 180 degrees.

11. A single-phase brushless motor according to claim 1, wherein said field magnet as a rotor has 4 alternate north and south magnetic pole zones, each of either the north or the south magnetic pole zones of said field magnet having an angular width equal to an electrical angle of about 120 degrees while each of the other magnetic pole zones has an angular width equal to an electrical angle of about 240 degrees, and said stator armature core has a plurality of stator poles formed thereon in an opposing relationship to said field magnet with an air gap left therebetween, said armature coils including a first armature coil for the phase A wound on one of said stator poles formed at a position of an electrical angle of about m·360·a degrees, where m=1 and a=1, a second armature coil for the phase A wound in the reverse direction to that of said first armature coil for the phase A on one of said stator poles formed at a position circumferentially spaced by an angular distance equal to an electrical angle of about 120 degrees from the stator pole on which said first armature coil for the phase A is wound, a third armature coil for the phase A' wound in the reverse direction to that of said first armature coil for the phase A on the stator pole on which said second armature coil for the phase A is wound, a fourth armature coil for the phase A' wound in the same winding direction as said first armature coil for the phase A on one of said stator poles formed at a position circumferentially spaced by an angular distance equal to an electrical angle of about n·(360·b−240) degrees, where n=1 and b=1, from the stator pole on which said first armature coil for the phase A is wound, a fifth armature coil for the phase B wound in the same winding direction as said first armature coil for the phase A on one of said stator poles formed at a position circumferentially spaced by an angular distance equal to an electrical angle of about n·(360·d−180) degrees, where n=1 and d=1, from the stator pole on which said first armature coil for the phase A is wound, a sixth armature coil for the phase B wound in the reverse direction to that of said first armature coil for the phase A on one of said stator poles formed at a position circumferentially spaced by an angular distance equal to an electrical angle of about n·(360·e−60) degrees, where n=1 and e=1, from the stator pole on which said first armature coil for the phase A is wound, a seventh armature coil for the phase B' wound in the reverse direction to that of said first armature coil for the phase A on the stator pole on which said sixth armature coil is wound, and an eighth armature coil for the phase B' wound in the same winding direction as said first armature coil for the phase A on one of said stator poles formed at a position circumferentially spaced by an angular distance equal to an electrical angle of about n·(360·f−180) degrees, where n=1 and f=1, from the stator pole on which said fourth armature coil for the phase A' is wound, said electric circuit being operable to detect the position of said field magnet to energize the armature coils for the phases A and A' and the armature coils for the phases B and B' alternatively at an electric angle of about 180 degrees.

12. A single-phase brushless motor according to claim 1, further comprising a position-detecting magnet rotor having 2P alternate north and south magnetic pole zones each having an angular width equal to an electrical angle of about 180 degrees, and a single magnetic sensor for detecting a magnetic pole of said position-detecting magnet rotor to develop to said electric circuit a signal to cause said armature coils to generate a turning torque in a predetermined direction.

13. A single-phase brushless motor according to claim 12, wherein said position-detecting magnet rotor is formed by magnetizing a magnetizable body of said field magnet.

14. A single-phase brushless motor according to claim 1, wherein said stator armature core includes a member for reducing a cogging torque which is caused by said stator poles and gaps between said stator poles.

15. A single-phase brushless motor according to claim 14, wherein said member is a magnetic member in the form of a ring having a small thickness and secured to a face of said stator armature core opposing to said field magnet with said air gap interposed therebetween.

16. A single-phase brushless motor according to claim 15, wherein said magnetic member in the form of a ring is secured to a circumferential face of said stator armature core opposing to said field magnet with said air gap interposed therebetween where said single-phase brushless motor is of the radial air gap type.

17. A single-phase brushless motor according to claim 16, wherein said magnetic member in the form of a ring is secured to an outer circumferential face of said stator armature core opposing to said field magnet with said air gap interposed therebetween where said single-phase brushless motor is of the radial air gap type and also of the outer rotor type.

* * * * *